(12) United States Patent
Mizoguchi

(10) Patent No.: US 12,400,546 B2
(45) Date of Patent: Aug. 26, 2025

(54) VEHICLE TRAVELING CONTROL APPARATUS, VEHICLE, AND SERVER

(71) Applicant: SUBARU CORPORATION, Tokyo (JP)

(72) Inventor: Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 304 days.

(21) Appl. No.: 18/179,883

(22) Filed: Mar. 7, 2023

(65) Prior Publication Data

US 2023/0306851 A1   Sep. 28, 2023

(30) Foreign Application Priority Data

Mar. 28, 2022   (JP) ................. 2022-051649

(51) Int. Cl.
*G08G 1/16* (2006.01)
*B60W 30/16* (2020.01)
*B60W 30/18* (2012.01)
*B60W 40/105* (2012.01)

(52) U.S. Cl.
CPC ............ *G08G 1/167* (2013.01); *B60W 30/16* (2013.01); *B60W 30/18163* (2013.01); *B60W 40/105* (2013.01); *G08G 1/164* (2013.01); *G08G 1/166* (2013.01); *B60W 2554/802* (2020.02); *B60W 2556/50* (2020.02)

(58) Field of Classification Search
None
See application file for complete search history.

(56) References Cited

U.S. PATENT DOCUMENTS

| 2022/0089164 | A1* | 3/2022 | Wang | B60W 30/18163 |
| 2022/0194372 | A1* | 6/2022 | Kitajima | B60W 30/143 |
| 2022/0250622 | A1* | 8/2022 | Yu | B60W 30/18154 |
| 2023/0005374 | A1* | 1/2023 | Elimaleh | G08G 1/065 |
| 2024/0043037 | A1* | 2/2024 | Bagnell | B60W 60/0027 |

FOREIGN PATENT DOCUMENTS

JP   2017-132408 A   8/2017

* cited by examiner

*Primary Examiner* — Wade Miles
*Assistant Examiner* — Arslan Azhar
(74) *Attorney, Agent, or Firm* — Rimon P.C.

(57) ABSTRACT

A vehicle traveling control apparatus includes a selection unit and a traveling control unit. The selection unit selects a control target vehicle for a first vehicle traveling on a merging destination lane, out of one or more second vehicles traveling on a merging origin lane, by comparing respective front-rear positions of front ends of the vehicles. The traveling control unit controls traveling of the first vehicle traveling on the merging destination lane, to allow the selected control target vehicle to merge immediately in front of the first vehicle on the merging destination lane. The traveling control unit executes control of allowing the control target vehicle to merge immediately in front of the first vehicle if the control target vehicle is selected, and refrains from executing control of allowing any of the second vehicles to merge immediately in front of the first vehicle if the control target vehicle is not selected.

16 Claims, 12 Drawing Sheets

VEHICLE TRAVELING CONTROL APPARATUS, VEHICLE, AND SERVER

CROSS-REFERENCE TO RELATED APPLICATIONS

The present application claims priority from Japanese Patent Application No. 2022-051649 filed on Mar. 28, 2022, the entire contents of which are hereby incorporated by reference.

BACKGROUND

The disclosure relates to a vehicle traveling control apparatus, a vehicle, and a server. Research and development have been made for traveling based on automatic driving of vehicles including automobiles.

Even in a case of traveling under automatic driving, a vehicle is to be able to smoothly merge in a merging section of a road and keep traveling.

For example, it is desired that a vehicle traveling on a merging origin lane of the merging section keep traveling to move from the merging origin lane to a merging destination lane without stopping at, for example, an ending point of the merging section.

It is also desired that a vehicle traveling on the merging destination lane of the merging section keep traveling on the merging destination lane, while accelerating or decelerating as appropriate so as not to interfere with traveling of the vehicle on the merging origin lane that merges in the merging section.

There is also an idea that, in traveling in the merging section, it is effective for the vehicle on the merging origin lane and the vehicle on the merging destination lane to merge one by one in order before the ending point of the merging section.

Such smooth merging is to be achieved by a vehicle that travels on the basis of automatic driving, as well as a vehicle that is operated by a driver. For example, in a case where a vehicle under automatic driving and a vehicle that is operated by a driver travel in a merging section in mixture, it is expected that merging one by one in order near an ending point of the merging section makes it possible to achieve smooth merging that does not give a feeling of strangeness to the driver.

SUMMARY

An aspect of the disclosure provides a vehicle traveling control apparatus configured to be used to control traveling of a first vehicle traveling in a merging section. The vehicle traveling control apparatus includes a selection unit and a traveling control unit. The selection unit is configured to select a control target vehicle for the first vehicle traveling on a merging destination lane of the merging section, out of one or more second vehicles traveling on a merging origin lane of the merging section. The traveling control unit is configured to control the traveling of the first vehicle traveling on the merging destination lane, to allow the selected control target vehicle to merge immediately in front of the first vehicle on the merging destination lane. The selection unit is configured to compare respective front-rear positions of a front end of the first vehicle and a front end of each of the one or more second vehicles, and select, as the control target vehicle for the first vehicle, a second vehicle from the one or more second vehicles. The second vehicle is located forward of the first vehicle. The traveling control unit is configured to, when the control target vehicle is selected from the one or more second vehicles, execute, regarding the traveling of the first vehicle, control of allowing the control target vehicle on the merging origin lane to merge immediately in front of the first vehicle on the merging destination lane, and, when where the control target vehicle is not selected from the one or more second vehicles, refrain from executing, regarding the traveling of the first vehicle, control of allowing any of the one or more second vehicles on the merging origin lane to merge immediately in front of the first vehicle on the merging destination lane.

An aspect of the disclosure provides a vehicle including a sensor and a traveling control processor. The sensor is configured to perform detection of one or more second vehicles located around a first vehicle serving as the vehicle. The traveling control processor is configured to control traveling of the first vehicle by using at least a result of the detection performed by the sensor. When the first vehicle travels on a merging destination lane of a merging section, the traveling control processor is configured to, when a control target vehicle is selected from the one or more second vehicles traveling on a merging origin lane of the merging section, based on comparison between respective front-rear positions of a front end of the first vehicle and a front end of each of the one or more second vehicles, execute control of allowing the control target vehicle on the merging origin lane to merge immediately in front of the first vehicle on the merging destination lane, and, when the control target vehicle is not selected from the one or more second vehicles, refrain from executing control of allowing any of the one or more second vehicles on the merging origin lane to merge immediately in front of the first vehicle on the merging destination lane.

An aspect of the disclosure provides a server including a communicator and a processor. The communicator is configured to communicate with a first vehicle and one or more second vehicles to control or assist traveling of the first vehicle. The processor is configured to generate traveling control information for the first vehicle based on at least information acquired by the communicator. The processor includes an acquisition unit, a selection unit, and a traveling control unit. The acquisition unit is configured to acquire information regarding traveling of the first vehicle and the one or more second vehicles, from the first vehicle and the one or more second vehicles traveling in a merging section. The selection unit is configured to select a control target vehicle for the first vehicle traveling on a merging destination lane of the merging section, out of the one or more second vehicles traveling on a merging origin lane of the merging section, by comparing, based on the acquired information, respective front-rear positions of a front end of the first vehicle and a front end of each of the one or more second vehicles. The traveling control unit is configured to control the traveling of the first vehicle traveling on the merging destination lane, to allow the control target vehicle to merge immediately in front of the first vehicle on the merging destination lane. The selection unit is configured to compare the respective front-rear positions of the front end of the first vehicle and the front end of each of the one or more second vehicles, and select, as the control target vehicle, a second vehicle from the one or more second vehicles. The second vehicle is located forward of the first vehicle. The traveling control unit is configured to, when the control target vehicle is selected from the one or more second vehicles, execute, regarding the traveling of the first vehicle, control of allowing the control target vehicle on the merging origin lane to merge immediately in front of the first vehicle on the merging destination lane, and, when the control target vehicle is not selected from the one or more second vehicles, refrain from executing, regarding the traveling of the first vehicle, control of allowing any of the one or more second vehicles on the merging origin lane to merge immediately in front of the first vehicle on the merging destination lane.

An aspect of the disclosure provides a vehicle traveling control apparatus configured to be used to control traveling of a first vehicle traveling in a merging section. The vehicle traveling control apparatus includes circuitry configured to select a control target vehicle for the first vehicle traveling on a merging destination lane of the merging section, out of one or more second vehicles traveling on a merging origin lane of the merging section, and control the traveling of the first vehicle traveling on the merging destination lane, to allow the selected control target vehicle to merge immediately in front of the first vehicle on the merging destination lane. The circuitry is configured to, when selecting the control target vehicle, compare respective front-rear positions of a front end of the first vehicle and a front end of each of the one or more second vehicles, and select, as the control target vehicle for the first vehicle, a second vehicle from the one or more second vehicles. The second vehicle is located forward of the first vehicle. When controlling the traveling of the first vehicle, the circuitry is configured to, when the control target vehicle is selected from the one or more second vehicles, execute, regarding the traveling of the first vehicle, control of allowing the control target vehicle on the merging origin lane to merge immediately in front of the first vehicle on the merging destination lane, and, when the control target vehicle is not selected from the one or more second vehicles, refrain from executing, regarding the traveling of the first vehicle, control of allowing any of the one or more second vehicles on the merging origin lane to merge immediately in front of the first vehicle on the merging destination lane.

An aspect of the disclosure provides a server including a communicator and circuitry. The communicator is configured to communicate with a first vehicle and one or more second vehicles to control or assist traveling of the first vehicle. The circuitry is configured to generate traveling control information for the first vehicle based on at least information acquired by the communicator. The circuitry is configured to acquire information regarding traveling of the first vehicle and the one or more second vehicles, from the first vehicle and the one or more second vehicles traveling in a merging section, select a control target vehicle for the first vehicle traveling on a merging destination lane of the merging section, out of the one or more second vehicles traveling on a merging origin lane of the merging section, by comparing, based on the acquired information, respective front-rear positions of a front end of the first vehicle and a front end of each of the one or more second vehicles, and control the traveling of the first vehicle traveling on the merging destination lane, to allow the control target vehicle to merge immediately in front of the first vehicle on the merging destination lane. The circuitry is configured to, when selecting the control target vehicle, compare the respective front-rear positions of the front end of the first vehicle and the front end of each of the one or more second vehicles, and select, as the control target vehicle for the first vehicle, a second vehicle from the one or more second vehicles. The second vehicle is located forward of the first vehicle. When controlling the traveling of the first vehicle, the circuitry is configured to, when the control target vehicle is selected from the one or more second vehicles, execute, regarding the traveling of the first vehicle, control of allowing the control target vehicle on the merging origin lane to merge immediately in front of the first vehicle on the merging destination lane, and, when the control target vehicle is not selected from the one or more second vehicles, refrain from executing, regarding the traveling of the first vehicle, control of allowing any of the one or more second vehicles on the merging origin lane to merge immediately in front of the first vehicle on the merging destination lane.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
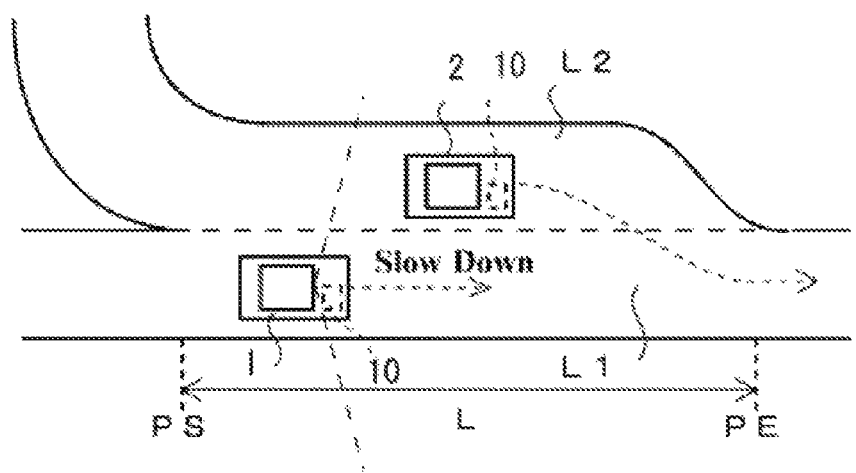
FIG. 1 is an explanatory diagram illustrating a first traveling state in which a vehicle to which the disclosure is applicable is traveling in a merging section.

Japanese Unexamined Patent Application Publication (JP-A) No. 2017-132408 discloses a technique of calculating a deceleration rate of the own vehicle desired for a vehicle traveling on a merging origin lane in a merging section to merge in front of the own vehicle, and a deceleration rate of the merging vehicle desired for the merging vehicle to merge behind the own vehicle, and executing control for merging in which an absolute value of the deceleration rate is smaller.

In this case, the vehicle traveling on the merging origin lane in the merging section is able to merge in front of or behind the vehicle traveling on a merging destination lane in the merging section. It is possible to suppress an amount of deceleration of the vehicle traveling on the merging origin lane or an amount of deceleration of the vehicle traveling on the merging destination lane for merging. In addition, it is basically possible to achieve smooth merging that does not give a feeling of strangeness to a driver who drives the vehicle. It is expected that JP-A No. 2017-132408 makes it possible to achieve smooth merging that does not give a feeling of strangeness to a driver, as compared with, for example, a case of merely executing deceleration at the time of merging on the basis of that the rear of another vehicle on an adjacent lane is imaged in a captured image obtained by an in-vehicle camera.

However, the merging control described in JP-A No. 2017-132408 gives no consideration to a size and a characteristic of the vehicle that merges. Vehicles traveling on a road include not only a small-sized vehicle and an ordinary-sized vehicle, but also a large-sized vehicle. The large-sized vehicle is longer than the ordinary-sized vehicle, and can have difficulty in acceleration or deceleration as compared with the ordinary-sized vehicle. For example, a large-sized vehicle carrying the maximum payload can be unable to sufficiently decelerate unless using a longer time than the ordinary-sized vehicle. In such a case, if the vehicle that is to execute deceleration control is selected on the basis of a magnitude of the absolute value of the deceleration rate as in JP-A No. 2017-132408, the vehicle can be unable to decelerate sufficiently in time. For example, even if the own vehicle somewhat decelerates, it can be difficult to make a space that allows a long, large-sized vehicle that is about to merge to safely merge in front of the own vehicle. In another example, a long, large-sized vehicle that is about to merge can merge without sufficiently decelerating to be able to safely merge behind the own vehicle. Occurrence of these events can give a feeling of strangeness to drivers of vehicles, even though the vehicles do not come into contact with each other. For example, in a case where the own vehicle decelerates relatively greatly, and a long, large-sized vehicle moves forward from behind the own vehicle to merge, the driver of the own vehicle can feel that the merging involves a risk.

It is desirable to provide a vehicle traveling control apparatus, a vehicle, and a server that make it possible to, in vehicle traveling control, achieve smooth merging while reducing a feeling of strangeness given to a driver.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

FIG. 1 is an explanatory diagram illustrating a first traveling state in which a vehicle 1 to which the disclosure is applicable is traveling in a merging section.

The vehicle 1 in FIG. 1 may be an automobile, for example. The vehicle 1 may also be referred to as an own vehicle. In one embodiment, the vehicle 1 may serve as a "first vehicle". Examples of the vehicle may further include a motorcycle and a personal mobility. The vehicle may include a drive source such as an engine or a motor, and may travel by means of a drive force generated by the drive source. The vehicle 1 may travel on the basis of automatic driving, or may be able to travel in accordance with operations performed by a driver who drives the vehicle 1. The vehicle 1 may also be able to travel while assisting the driver's operations. In the following, traveling control based on automatic driving may include traveling control based on driving assistance.

FIG. 1 illustrates the vehicle 1 traveling on a merging destination lane L1 in the merging section of a road. The merging section may have a length L from a starting point PS to an ending point PE. FIG. 1 also illustrates, in the merging section, another vehicle 2 traveling on a merging origin lane L2. The other vehicle 2 may be an automobile, for example. In one embodiment, the other vehicle 2 may serve as a "second vehicle". The other vehicle 2 may move from the merging origin lane L2 to the merging destination lane L1 in the merging section. In FIG. 1, the preceding other vehicle 2 may move from the merging origin lane L2 to the merging destination lane L1 in front of the vehicle 1. In this case, in general, the vehicle 1 may keep traveling on the merging destination lane L1 while decelerating, or slowing down, to keep an inter-vehicle distance corresponding to an own vehicle speed between the vehicle 1 and the other vehicle 2 that becomes a preceding vehicle as a result of merging. The vehicle 1 may thereafter travel at a speed similar to that of the other vehicle 2, while keeping the inter-vehicle di stance.

Figure 2:
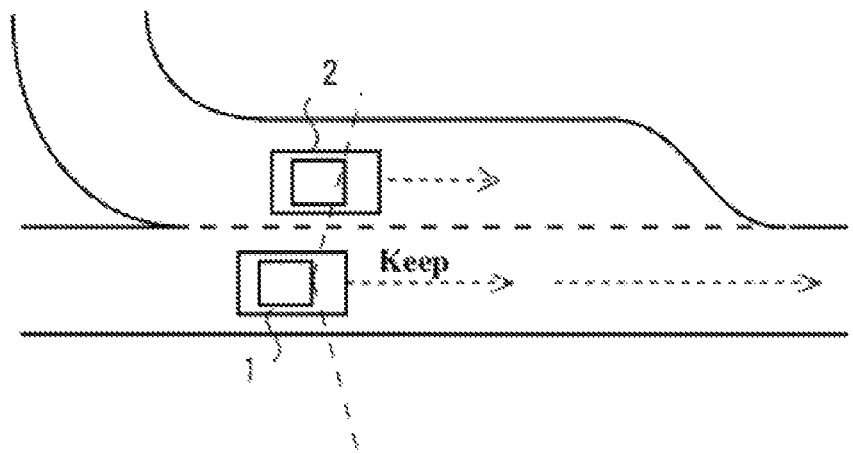
FIG. 2 is an explanatory diagram illustrating a second traveling state in the merging section, different from the traveling state in FIG. 1.

FIG. 2 is an explanatory diagram illustrating a second traveling state in the merging section, different from the traveling state in FIG. 1.

FIG. 2 illustrates the vehicle 1 traveling in the same merging section as that in FIG. 1. Note that the vehicle 1 may be in a state of traveling in parallel with the other vehicle 2 in the merging section. In this case, the vehicle 1 may typically keep traveling on the merging destination lane L1, while keeping the speed of the own vehicle without decelerating. The other vehicle 2 may move from the merging origin lane L2 to the merging destination lane L1 behind the vehicle 1. The other vehicle 2 may have to decelerate as necessary on the merging origin lane L2, and thereafter move from the merging origin lane L2 to the merging destination lane L1.

Figure 3:
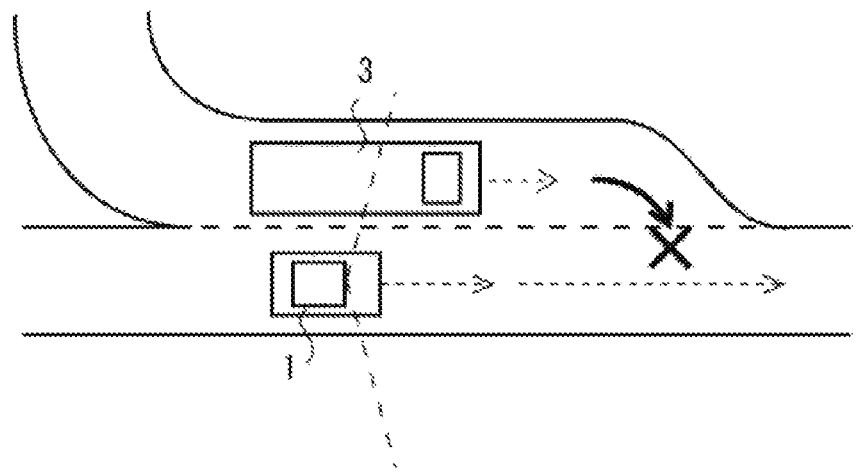
FIG. 3 is an explanatory diagram illustrating a third traveling state in the merging section, different from the traveling state in FIG. 2.

FIG. 3 is an explanatory diagram illustrating a third traveling state in the merging section, different from the traveling state in FIG. 2.

FIG. 3 illustrates the vehicle 1 in a state of traveling in parallel with the other vehicle 2 in the same merging section as that in FIG. 2. Note that the other vehicle 2 may be a large-sized vehicle 3. The large-sized vehicle 3 may have a size and a characteristic greatly different from those of a small-sized vehicle and an ordinary-sized vehicle. The large-sized vehicle 3 may typically be longer than the ordinary-sized vehicle and have difficulty in acceleration or deceleration as compared with the ordinary-sized vehicle. The large-sized vehicle 3 carrying the maximum payload can be unable to sufficiently decelerate unless using a longer time than the ordinary-sized vehicle. Because acceleration or deceleration takes time, even if the large-sized vehicle 3 tries to decelerate on the merging origin lane L2 of the merging section, the large-sized vehicle 3 can be unable to sufficiently decelerate to recede behind the vehicle 1 traveling in parallel in the merging section. In this case, the vehicle 1 may typically keep traveling on the merging destination lane L1 while basically keeping the speed of the own vehicle without decelerating. However, it may be desired in some cases to greatly decelerate to allow the large-sized vehicle 3 present on the merging origin lane L2 to precede and allow the large-sized vehicle 3 to merge in front of the own vehicle.

It may be desired that the vehicle 1 achieve smooth merging in the merging section of the road, even in a case where the vehicle 1 is traveling on the basis of automatic driving. However, it is difficult for an existing technique to achieve smooth merging in the various traveling states at the time of merging described above. If smooth merging is not achieved, vehicles can interfere with each other, or a vehicle can stop at the ending point PE of the merging section.

For example, the vehicle 1 that is able to travel under automatic driving as illustrated in FIGS. 1 to 3 may be provided with a vehicle outside camera 26 that captures an image in a traveling direction. In a case of determining presence or absence of a preceding vehicle on the basis of the captured image in the traveling direction, the vehicle 1 may, in general, recognize a preceding vehicle on the basis of that the rear of the preceding vehicle is imaged in the image. Further, the vehicle 1 may perform traveling control at the time of merging to give way to the recognized preceding vehicle. The vehicle 1 may have to accelerate or decelerate as appropriate so as not to interfere with traveling of the other vehicle 2 on the merging origin lane L2 that merges in the merging section.

On the other hand, not only the vehicle 1 traveling on the basis of automatic driving, but also the vehicle 1 traveling on the basis of manual driving under the driver's recognition is present on the actual road. It may be desired that the vehicle 1 traveling on the basis of automatic driving achieve smooth merging under such a mixture environment. Merging may be controlled to cause the vehicles to merge one by one in order near the ending point of the merging section.

Thus, in traveling control of the vehicle 1, smooth merging is to be achieved, while reducing a feeling of strangeness given to a driver who drives a vehicle other than the own vehicle.

Figure 4:
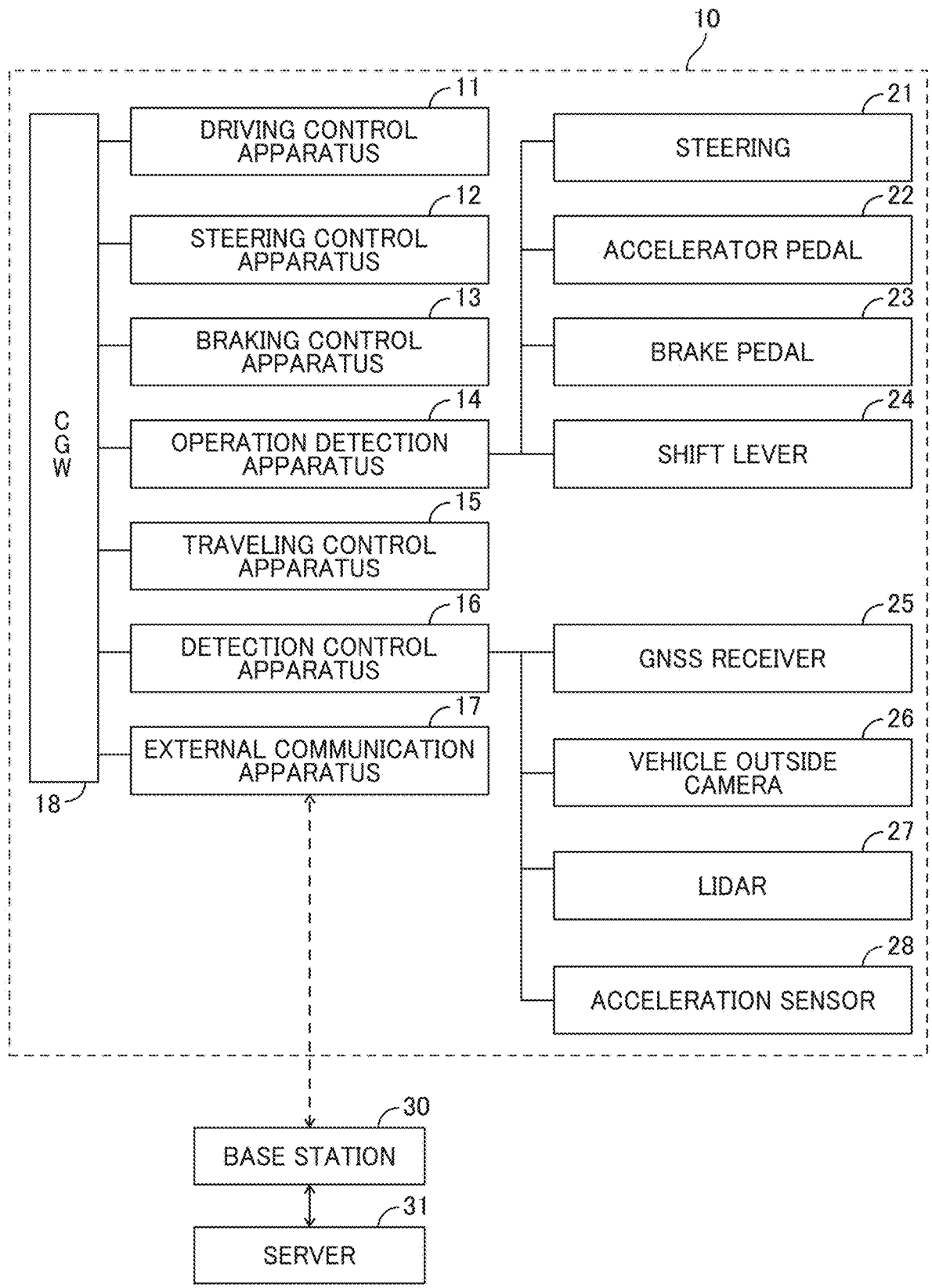
FIG. 4 is an explanatory diagram illustrating a control system of the vehicle in FIG. 1.

FIG. 4 is an explanatory diagram illustrating a control system 10 of the vehicle 1 in FIG. 1.

In one embodiment, the control system 10 in FIG. 4 may serve as a "vehicle traveling control apparatus" to be provided in the vehicle 1 in FIG. 1.

The control system 10 of the vehicle 1 in FIG. 4 may include control apparatuses including a traveling control apparatus 15 that executes automatic driving. FIG. 4 illustrates the control apparatuses including a driving control apparatus 11, a steering control apparatus 12, a braking control apparatus 13, an operation detection apparatus 14, the traveling control apparatus 15, a detection control apparatus 16, and an external communication apparatus 17. The control system 10 of the vehicle 1 may further include other control apparatuses including, for example, an air conditioning control apparatus, an occupant monitoring apparatus, a short-range communication apparatus, and an alarm apparatus. The control apparatuses may be coupled to a central gateway (CGW) 18 via cables. The CGW 18 may configure a vehicle network. The cables may be coupled to the CGW 18. The control apparatuses may be star-coupled or bus-coupled to the CGW 18. The vehicle network may be based on a standard such as a controller area network (CAN) or a local interconnect network (LIN). Alternatively, the vehicle network may be based on a general-purpose wired communication standard such as a local area network (LAN), a wireless communication standard, or a combination thereof. An identification (ID) may be assigned to each of the control apparatuses for distinction from the other control apparatuses. The control apparatuses may each input and output various pieces of information in packets with a destination ID and a sender ID added thereto. The CGW 18 may monitor the packets on the vehicle network and perform routing thereon. The CGW 18 may verify the packets against a list and control the routing.

The driving control apparatus 11 may control the drive source and a drive force transmission mechanism of the vehicle 1. The drive force transmission mechanism may include, for example, a decelerator and a central differential. The drive force transmission mechanism may control magnitudes of the drive forces to be transmitted to wheels of the vehicle 1 on an individual basis.

The steering control apparatus 12 may control a steering device that changes orientations of the front wheels of the vehicle 1. The vehicle 1 may change the traveling direction in response to changes in orientation of the wheels.

The braking control apparatus 13 may control a braking device that brakes the wheels of the vehicle 1 on an individual basis. The braking device may control magnitudes of braking forces to be exerted on the wheels of the vehicle 1 on an individual basis.

Operation members may be coupled to the operation detection apparatus 14. The operation members may be provided in the vehicle 1 to allow an occupant of the vehicle 1 to perform operations related to traveling of the vehicle 1. The operation members may include, for example, a steering 21, an accelerator pedal 22, a brake pedal 23, and a shift lever 24. The operation detection apparatus 14 may detect, for example, whether an operation has been performed and an amount of the operation for each of the operation members, and may output operation information to the vehicle network.

Detection members may be coupled to the detection control apparatus 16. The detection members may be provided to detect the traveling state and a traveling environment of the vehicle 1. The detection members may include, for example, a global navigation satellite system (GNSS) receiver 25, a vehicle outside camera 26, a light detection and ranging (LiDAR) 27, and an acceleration sensor 28.

The GNSS receiver 25 may receive radio waves from unillustrated GNSS satellites and generate information on a current position at which the vehicle 1 equipped with the GNSS receiver 25 is located, and a current time. The GNSS receiver 25 may be able to receive ground waves or radio waves from a quasi-zenith satellite to thereby generate highly accurate information on the current position and the current time.

The vehicle outside camera 26 may capture an image of the outside of the vehicle 1 which travels on a road, for example. The vehicle 1 may be provided with multiple vehicle outside cameras 26. The multiple vehicle outside cameras 26 may capture images of a 360-degree range around the vehicle 1 in forward, backward, rightward, and leftward directions. Images to be captured by the vehicle outside camera 26 may include an image of, for example, the other vehicle 2 located around the vehicle 1. The vehicle 1 may capture images of at least a forward side in the traveling direction of the vehicle 1 as illustrated in FIG. 1, for example, with the vehicle outside camera 26.

The LiDAR 27 may scan with a laser the outside of the vehicle 1 which travels on a road, for example, and may generate outside-vehicle spatial information on the basis of a reflected wave of a laser beam. The outside-vehicle spatial information may include an image of, for example, another vehicle 2 located around the vehicle 1. In one embodiment, the vehicle outside camera 26 and the LiDAR 27 may each serve as a "sensor" that detects the other vehicle 2 located around the vehicle 1.

The acceleration sensor 28 may detect accelerations in three axial directions including a front-rear direction, a left-right direction, and an up-down direction of the vehicle 1, for example. In this case, the acceleration sensor 28 may be able to detect accelerations in a yaw direction, a roll direction, and a pitch direction of the vehicle 1.

The detection control apparatus 16 may output detection information available from these various detection members provided in the own vehicle to the vehicle network. The detection control apparatus 16 may generate information on the basis of the detection information, for example, detection information on the other vehicle 2 located around the own vehicle, and may output the generated information to the vehicle network.

The external communication apparatus 17 may establish a wireless communication path to a base station 30 provided near, for example, a road outside the vehicle 1. The base station 30 may be a base station of a carrier, or may be a base station for advanced traffic information. The external communication apparatus 17 may, via the base station 30, transmit and receive information to and from a server 31 or other apparatuses coupled to the base station 30. The server 31 may be provided in correspondence with the base station 30. By providing the base station 30 for 5G communication with a function of the server 31, it becomes possible for the external communication apparatus 17 of the vehicle 1 to execute a high-speed and large-capacity communication with the server 31 of the base station 30.

The traveling control apparatus 15 controls the traveling of the vehicle 1.

The traveling control apparatus 15 may execute traveling control of the vehicle 1 based on the driver's operations, traveling control of the vehicle 1 assisting the driver's operations, and traveling control under automatic driving without the driver's operations.

For example, the traveling control apparatus 15 may generate a control value assisting the driver's operations, on the basis of information obtained by the operation detection apparatus 14, and output the control value to the driving control apparatus 11, the steering control apparatus 12, and the braking control apparatus 13.

The traveling control apparatus 15 may execute lane keep control and preceding-vehicle following control keeping a traveling lane, on the basis of information obtained by the detection control apparatus 16 and high-precision map data, and generate and output a control value for automatic driving.

In one embodiment, the traveling control apparatus 15 may thus serve as a "traveling control processor" that controls the traveling of the vehicle 1 by using at least a detection result obtained by the sensor.

Figure 5:
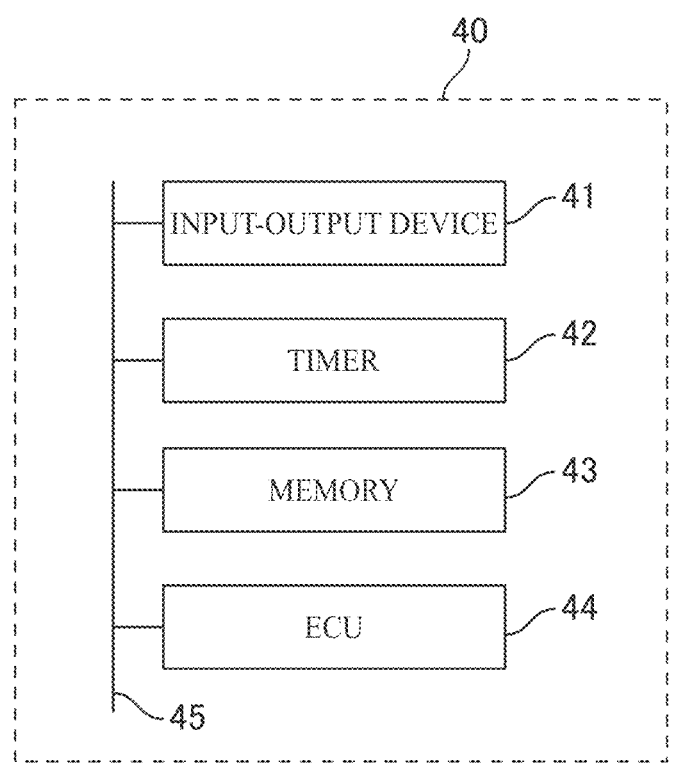
FIG. 5 is a diagram illustrating a basic configuration of a control apparatus that may be used as various control apparatuses in FIG. 4.

FIG. 5 is a diagram illustrating a basic configuration of a control apparatus 40 that may be used as the various control apparatuses in FIG. 4.

For example, the traveling control apparatus 15 may have the basic configuration in FIG. 5.

The control apparatus 40 in FIG. 5 may include an input-output device 41, a timer 42, a memory 43, an electronic control unit (ECU) 44, and an internal bus 45. The input-output device 41, the timer 42, the memory 43, and the ECU 44 may be coupled to the internal bus 45.

The input-output device 41 may be coupled to the vehicle network. The input-output device 41 may control input and output of information via the vehicle network. The input-output device 41 may acquire, for example, a packet with an ID corresponding to the own control apparatus added thereto, from the vehicle network, and output the packet to the ECU 44 via the internal bus 45. The input-output device 41 may add, for example, a sender ID corresponding to the own control apparatus and a destination ID to information acquired from the ECU 44 via the internal bus 45, and output the information to the vehicle network.

The timer 42 may measure a time and a time period. The time of the timer 42 may be calibrated by the current time obtained by the GNSS receiver 25.

The memory 43 may include, for example, a nonvolatile semiconductor memory, a hard disk drive (HDD), or a random access memory (RAM). The memory 43 may hold, for example, a program to be executed by the ECU 44, and data. The memory 43 of the traveling control apparatus 15 may hold, together with a program for traveling control, for example, a setting value of the traveling control, the detection information obtained by the detection control apparatus 16, the operation information obtained by the operation detection apparatus 14, and the high-precision map data. The high-precision map data held by the memory 43 may be updated with update data acquired by the external communication apparatus 17 from the server 31.

The ECU 44 may read the program held by the memory 43 and execute the program. This enables a processor to be implemented. For example, the ECU 44 of the traveling control apparatus 15 may execute the control by the traveling control apparatus 15 described above, to serve as a "traveling control unit" for traveling control in one embodiment. In one embodiment, the ECU 44 of the traveling control apparatus 15 may serve as a "selection unit" that selects a control target vehicle for the vehicle 1 traveling on the merging destination lane L1 of the merging section, out of one or more vehicles traveling on the merging origin lane L2 of the merging section.

Figure 6:
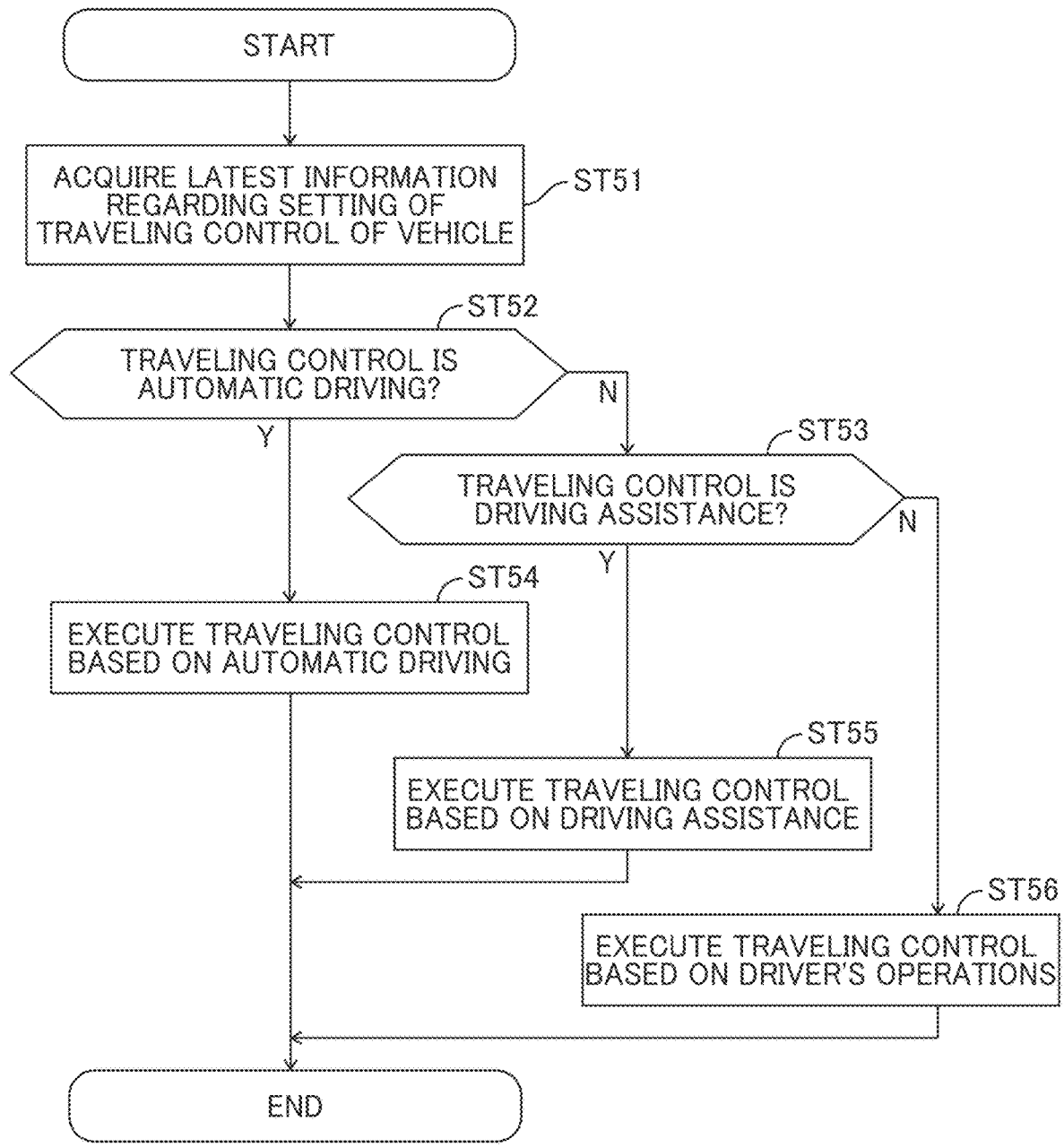
FIG. 6 is a flowchart illustrating basic traveling control to be performed by the vehicle in FIG. 1.

FIG. 6 is a flowchart illustrating basic traveling control to be performed by the vehicle 1 in FIG. 1.

The basic traveling control in FIG. 6 may be executed by the ECU 44 provided in the control system 10 in FIG. 4. The ECUs 44 of the control apparatuses 40 may execute the basic traveling control in FIG. 6 in cooperation with each other. Description here is given assuming that the ECU 44 of the traveling control apparatus 15 executes the basic traveling control in FIG. 6. In a case where the vehicle 1 travels, the ECU 44 of the traveling control apparatus 15 may repeatedly execute the basic traveling control in FIG. 6. In this case, the ECU 44 of the traveling control apparatus 15 may repeatedly execute the basic traveling control in FIG. 6 to execute traveling control switched between automatic driving, manual driving, and driving assistance while the vehicle 1 is traveling. The ECU 44 may start the basic traveling control in FIG. 6, for example, in a case where an unillustrated ignition switch of the vehicle 1 is turned ON, or in a case where the driver gets in the vehicle 1. The ECU 44 may end execution of the basic traveling control in FIG. 6, for example, in a case where the vehicle 1 arrives at the destination under automatic driving, in a case where the unillustrated ignition switch of the vehicle 1 is turned OFF, or in a case where the driver gets out of the vehicle 1.

In step ST51, the ECU 44 may acquire the latest information regarding, for example, setting of the traveling control of the vehicle 1. The ECU 44 may acquire, from the memory 43, for example, the setting value of the traveling control, the detection information obtained by the detection control apparatus 16, the operation information obtained by the operation detection apparatus 14, and the high-precision map data. The setting value of the traveling control may be, for example, a five-level setting value regarding an automatic driving level. The ECU 44 may also acquire the latest information such as detection information or operation information from another control apparatus coupled to the vehicle network.

In step ST52, the ECU 44 may determine, on the basis of the acquired latest information, whether the traveling control to be executed at present is automatic driving. For example, if the setting value of the traveling control indicates automatic driving, if the detection information permits automatic driving, or if the operation information is information indicating start of automatic driving (step ST52: Y), the ECU 44 may determine that traveling control based on automatic driving is to be executed, and cause the flow to proceed to step ST54. Otherwise (step ST52: N), the ECU 44 may cause the flow to proceed to step ST53.

In step ST53, the ECU 44 may determine, on the basis of the acquired latest information, whether the traveling control to be executed at present is driving assistance. For example, if the setting value of the traveling control indicates driving assistance, if the detection information does not permit automatic driving, or if the operation information is information indicating start of driving assistance (step ST53: Y), the ECU 44 may determine that traveling control based on driving assistance is to be executed, and cause the flow to proceed to step ST55. Otherwise (step ST53: N), the ECU 44 may cause the flow to proceed to step ST56.

In step ST54, the ECU 44 may execute traveling control based on automatic driving. In the traveling control for automatic driving, the ECU 44 may generate a course of the vehicle 1, for example, on the basis of a route toward a set destination, the high-precision map data, and the detection information, without the operation information. The ECU 44 may generate a control value to be used to control the traveling of the vehicle 1 in accordance with the generated course, and output the control value to the driving control apparatus 11, the steering control apparatus 12, and the braking control apparatus 13. In the traveling control for automatic driving, the ECU 44 may execute control such as the lane keep control, the preceding-vehicle following control, change of a traveling lane, merging or branching control in a merging section involving branching, obstacle avoidance, or emergency stop. The ECU 44 may select and execute a part of at least one of these various controls to control the traveling in the generated course. Thereafter, the ECU 44 may end this control.

In step ST55, the ECU 44 may execute traveling control based on driving assistance. In the traveling control based on driving assistance, the ECU 44 may generate a course of the vehicle 1, for example, on the basis of the route toward the set destination, the high-precision map data, and the detection information, together with the operation information. The course to be generated may be a course adjusted to enhance safety of the traveling while basically corresponding to the driver's operations. The ECU 44 may generate a control value to be used to control the traveling of the vehicle 1 in accordance with the generated course, and output the control value to the driving control apparatus 11, the steering control apparatus 12, and the braking control apparatus 13. In the traveling control based on driving assistance, the ECU 44 may execute control such as the lane keep control, the preceding-vehicle following control, the change of a traveling lane, the merging or branching control in a merging section involving branching, the obstacle avoidance, or the emergency stop. The ECU 44 may select and execute a part of at least one of these various controls to control the traveling in the generated course. Thereafter, the ECU 44 may end this control.

In step ST56, the ECU 44 may execute traveling control based on the driver's operations. In this case, the ECU 44 may generate a control value basically corresponding to only the operation information, and output the control value to the driving control apparatus 11, the steering control apparatus 12, and the braking control apparatus 13. Note that, in a case of making an emergency stop, for example, the ECU 44 may generate a control value similar to that in the traveling control based on automatic driving, and output the control value to the driving control apparatus 11, the steering control apparatus 12, and the braking control apparatus 13. Thereafter, the ECU 44 may end this control.

Figure 7:
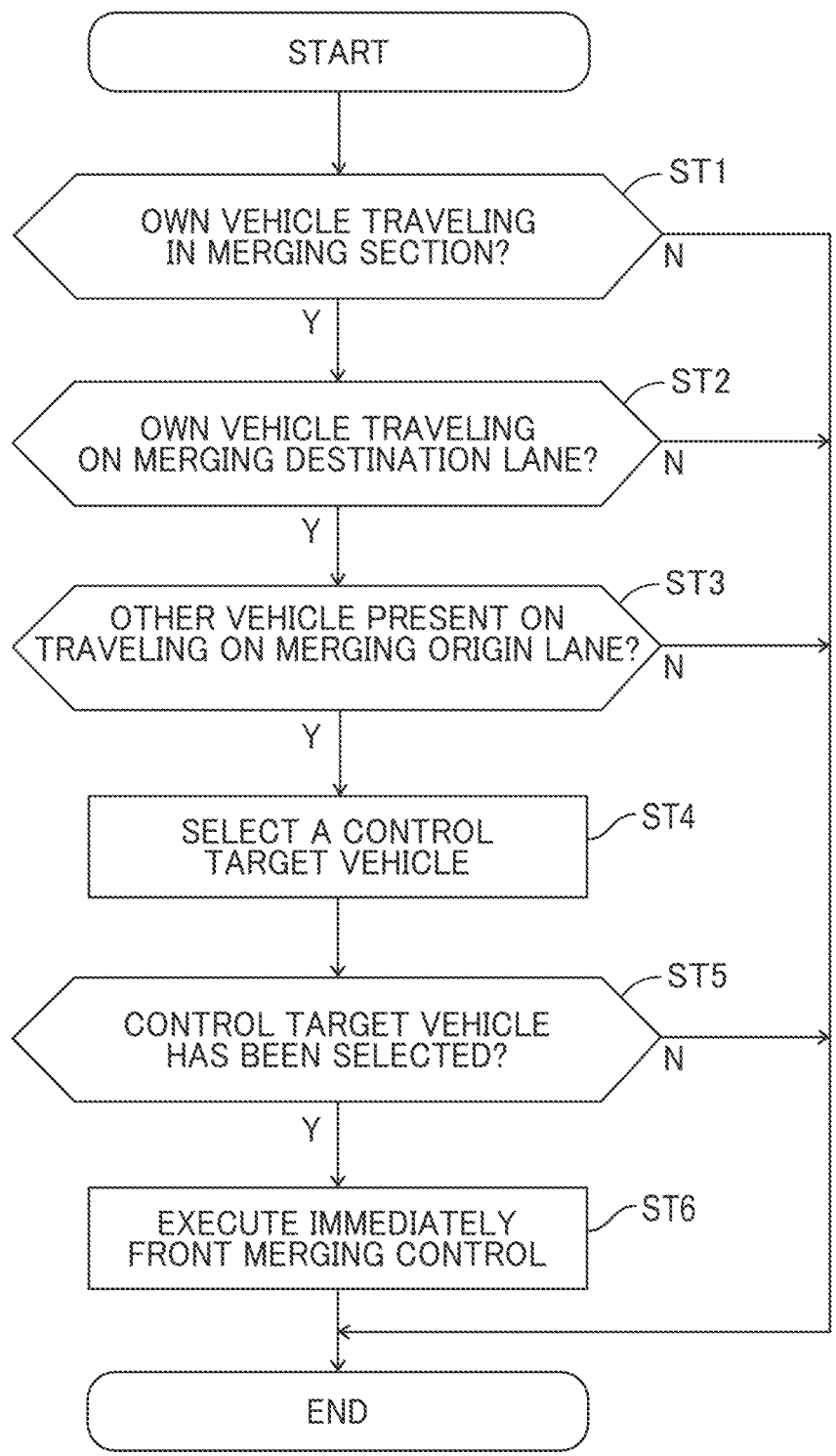
FIG. 7 is a flowchart illustrating merging traveling control according to one example embodiment of the disclosure.

FIG. 7 is a flowchart illustrating merging traveling control according to a first example embodiment of the disclosure.

At least in a case where the vehicle 1 is traveling on the merging origin lane L2 in the merging section of the road, the ECU 44 that executes the basic traveling control in FIG. 6 may execute the merging traveling control in FIG. 7 in at least step ST54 and step ST55 in FIG. 6.

In step ST1, the ECU 44 may determine whether the own vehicle is traveling in a merging section. The merging section may be, for example, a merging section installed on a road as illustrated in FIGS. 1 to 3. The ECU 44 may determine, for example, on the basis of position information of the own vehicle and the high-precision map data, whether the own vehicle is traveling in a merging section in the high-precision map data. If the own vehicle is not traveling in a merging section (step ST1: N), the ECU 44 may end this control. If the own vehicle is traveling in a merging section (step ST1: Y), the ECU 44 may cause the flow to proceed to step ST2.

In step ST2, the ECU 44 may determine whether the own vehicle is traveling on the merging destination lane L1 in the merging section. The ECU 44 may determine, for example, on the basis of the position information of the own vehicle and the high-precision map data, whether the own vehicle is traveling on the merging destination lane L1 of the merging section in the high-precision map data. In another example, the ECU 44 may determine whether the own vehicle is traveling on the merging destination lane L1 of the merging section in the high-precision map data, by comparing a road shape such as a lane boundary and a viewpoint position included in the captured image obtained by the vehicle outside camera 26, with information on a road shape at the current location in the high-precision map data. If the own vehicle is not traveling on the merging destination lane L1 of the merging section (step ST2: N), the ECU 44 may end this control. If the own vehicle is traveling on the merging destination lane L1 of the merging section (step ST2: Y), the ECU 44 may cause the flow to proceed to step ST3.

In step ST3, the ECU 44 may determine whether the other vehicle 2 traveling on the merging origin lane L2 is present in the merging section. In the captured image obtained by the vehicle outside camera 26, a predetermined angle-of-view range may be imaged basically with respect to the forward side in the traveling direction of the own vehicle. In a case where the own vehicle is provided with multiple vehicle outside cameras 26, the ECU 44 is able to also acquire images captured in sideward directions and the backward direction from the own vehicle. The ECU 44 may determine presence or absence of the other vehicle 2 traveling on the merging origin lane L2, on the basis of an image component of the merging origin lane L2 running in parallel included in these captured images obtained by the vehicle outside camera 26. A small-sized vehicle, an ordinary-sized vehicle, or the large-sized vehicle 3 may be included in the captured image with a given size and shape. The ECU 44 may analyze a portion different from a road surface included in the image to thereby detect the other vehicle 2 traveling on the merging origin lane L2 running in parallel. If the other vehicle 2 traveling on the merging origin lane L2 running in parallel is not detected (step ST3: N), the ECU 44 may end this control. If the other vehicle 2 traveling on the merging origin lane L2 running in parallel is detected (step ST3: Y), the ECU 44 may cause the flow to proceed to step ST4.

In step ST4, the ECU 44 may select a control target vehicle, out of multiple vehicles including the own vehicle traveling in the merging section, on the basis of a front-rear relationship with respect to a front end of each vehicle. The ECU 44 may select, as the control target vehicle, the other vehicle 2 whose front end is forward of the front end of the own vehicle, out of the one or more other vehicles 2 traveling on the merging origin lane L2. In this case, not only the other vehicle 2 in FIG. 1, but also the other vehicle 2 in FIG. 2 and the large-sized vehicle 3 in FIG. 3 may be selected as the control target vehicle. In a case where the other vehicle 2 whose front end is forward of the front end of the own vehicle is absent on the merging origin lane L2, the ECU 44 may refrain from selecting a control target vehicle, even if the other vehicle 2 is present on the merging origin lane L2.

Note that, in a case of selecting whether merging is possible and a control target vehicle at the time of merging in his/her own judgment, the driver may basically turn his/her eyes to an adjacent lane, and determine the front-rear position of the other vehicle 2 on the adjacent lane. In this case, the driver may make the determination by checking a front-rear position of a physical front end of the other vehicle 2 on the adjacent lane, or may make the determination by checking a front-rear position of an occupant such as a driver of the other vehicle 2. Examples of the physical front end of the vehicle may include a bumper. Therefore, to duplicate such checking of the front-rear position by the driver him/herself, the ECU 44 may select the control target vehicle on the basis of the front-rear relationship with respect to the front end of each vehicle. In this case, the ECU 44 may, for example, while using the physical front end of each vehicle, as the front end of the vehicle, as one reference for determination of the front-rear position, use the front-rear position of the driver of each vehicle, the driver's line-of-sight position, or the front-rear position of the driver's head or eyes, as an additional reference for determination of the front-rear position. In this case, the front end of the vehicle on the basis of which the ECU 44 determines the front-rear relationship may be at a position near the driver's line of sight, or a position on the forward side in the traveling direction relative to the position near the driver's line of sight. When determining the front-rear position of the vehicle, the ECU 44 may determine the front-rear position with respect to at least a portion, of each vehicle, forward of the driver's front-rear position, the driver's line-of-sight position, or the front-rear position of the driver's head or eyes.

The position of the front end to be used by the ECU 44 for determination on each vehicle may basically match between multiple vehicles whose front-rear relationship is to be determined, but does not have to match between the multiple vehicles. For example, the ECU 44 may use the front-rear position of the driver him/herself as the front end for determination regarding the own vehicle, and use, for example, the bumper serving as the physical front end of the vehicle as the front end for determination regarding the other vehicle 2. Even in such a contrast relationship, the front end of the vehicle serving as a reference to be used by the ECU 44 for determination of whether merging control is possible may be forward of the position of the vehicle or the driver's line-of-sight.

In step ST5, the ECU 44 may determine whether a control target vehicle has been selected. If the other vehicle 2 has been selected by the process of step ST4 (step ST5: Y), the ECU 44 may determine that a control target vehicle has been selected, and cause the flow to proceed to step ST6. If the other vehicle 2 has not been selected by the process of step ST4 (step ST5: N), the ECU 44 may end this control.

In step ST6, the ECU 44 may execute immediately front merging control for allowing the control target vehicle to merge immediately in front of the own vehicle. For example, the ECU 44 may cause deceleration to a speed equal to or less than that of the control target vehicle within the merging section. The ECU 44 may also control the vehicle speed of the own vehicle to make the inter-vehicle distance between the own vehicle and a preceding vehicle wider than a front-rear length of the control target vehicle. This allows not only the other vehicle 2 in FIG. 1, but also the other vehicle 2 in FIG. 2 and the large-sized vehicle 3 in FIG. 3 to move, in the merging section, from the merging origin lane L2 to a space on the merging destination lane L1 made in front of the own vehicle. Thereafter, the ECU 44 may end this control.

Note that, in step ST6, the ECU 44 may determine whether merging of the control target vehicle has ended, to determine the end of the merging control. In the captured image obtained by the vehicle outside camera 26, the other vehicle 2 that has merged in front of the own vehicle may be imaged. The ECU 44 may determine that merging of the control target vehicle has ended, by checking that the other vehicle 2 that has merged is traveling within the lane in the captured image obtained by the vehicle outside camera 26. If merging of the control target vehicle has not ended, the ECU 44 may continue the merging control in step ST6. The ECU 44 may continue the merging control in step ST6 until the ECU 44 determines that merging of the control target vehicle has ended.

Figure 8:
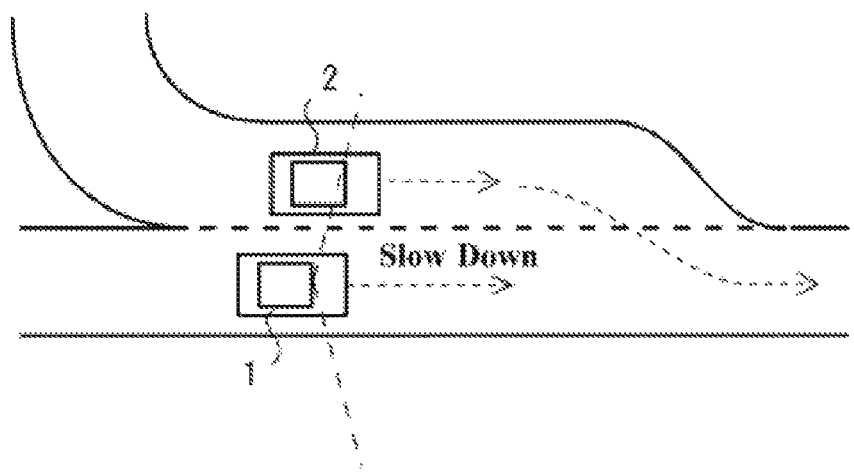
FIG. 8 is an explanatory diagram illustrating a traveling state in a merging section based on the merging traveling control according to one example embodiment, and corresponds to the second traveling state in FIG. 2.

FIG. 8 is an explanatory diagram illustrating a traveling state in a merging section based on the merging traveling control according to the first example embodiment. FIG. 8 corresponds to the second traveling state in FIG. 2.

In FIG. 8, the vehicle 1 traveling on the merging destination lane L1 and the other vehicle 2 traveling on the merging origin lane L2 may be traveling in parallel with each other in the merging section. In a case of selecting the control target vehicle by determination with respect to the front end as in FIG. 7, the vehicle 1 traveling on the merging destination lane L1 may select the other vehicle 2 traveling on the merging origin lane L2 as the control target vehicle. Further, the vehicle 1 traveling on the merging destination lane L1 may decelerate on the basis of the merging traveling control in FIG. 7. This allows the other vehicle 2 traveling on the merging origin lane L2 to move from the merging origin lane L2 to the merging destination lane L1 in the merging section.

Figure 9:
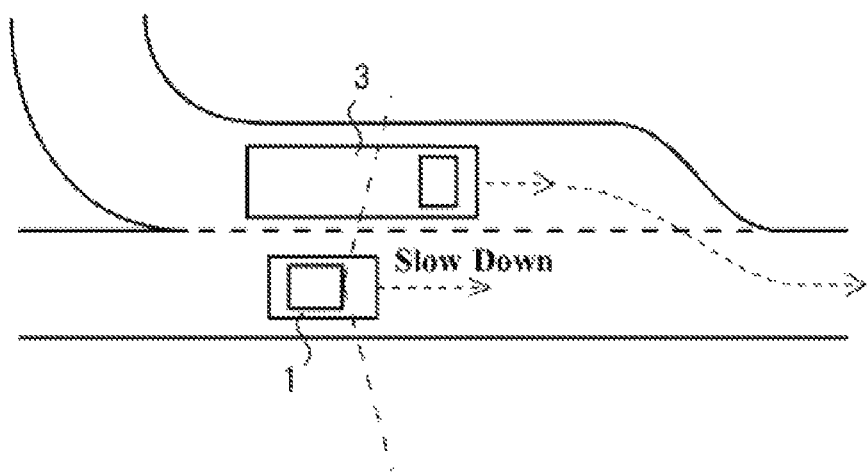
FIG. 9 is an explanatory diagram illustrating a traveling state in a merging section based on the merging traveling control according to one example embodiment, and corresponds to the third traveling state in FIG. 3.

FIG. 9 is an explanatory diagram illustrating a traveling state in a merging section based on the merging traveling control according to the first example embodiment. FIG. 9 corresponds to the third traveling state in FIG. 3.

In FIG. 9, the vehicle 1 traveling on the merging destination lane L1 and the large-sized vehicle 3 traveling on the merging origin lane L2 may be traveling in parallel with each other in the merging section. In a case of selecting the control target vehicle by determination with respect to the front end as in FIG. 7, the vehicle 1 traveling on the merging destination lane L1 may select the large-sized vehicle 3 traveling on the merging origin lane L2 as the control target vehicle. Further, the vehicle 1 traveling on the merging destination lane L1 may decelerate on the basis of the merging traveling control in FIG. 7. This allows the large-sized vehicle 3 traveling on the merging origin lane L2 to move from the merging origin lane L2 to the merging destination lane L1 in the merging section.

As described above, in the example embodiment, the ECU 44 serving as the selection unit selects the control target vehicle for the vehicle 1 traveling on the merging destination lane L1 of the merging section, out of the one or more vehicles traveling on the merging origin lane L2 of the merging section. In the example embodiment, the ECU 44 serving as the traveling control unit controls the traveling of the vehicle 1 traveling on the merging destination lane L1 to allow the selected control target vehicle to merge immediately in front of the own vehicle on the merging destination lane L1.

For example, in a case where two vehicles are traveling in parallel with each other in the merging section as in FIGS. 8 and 9, in the example embodiment, the ECU 44 serving as the selection unit compares the front-rear positions of the front ends of the vehicles. In a case where the front end of the vehicle (e.g., the other vehicle 2) on the merging origin lane L2 is located forward of the front end of the vehicle 1 on the merging destination lane L1, the ECU 44 serving as the selection unit selects the vehicle on the merging origin lane L2 as the control target vehicle for the vehicle 1 on the merging destination lane L1 traveling in parallel. The vehicle on the merging origin lane L2 traveling in parallel may be selected as the control target vehicle, as in a case where the vehicle on the merging origin lane L2 is preceding the vehicle 1 on the merging destination lane L1. On the basis of the control by the ECU 44 serving as the traveling control unit, the vehicle 1 on the merging destination lane L1 executes the control of allowing the control target vehicle on the merging origin lane L2 to merge immediately in front of the own vehicle on the merging destination lane L1. The vehicle on the merging origin lane L2 traveling in parallel with the vehicle 1 on the merging destination lane L1 in the merging section is able to smoothly merge in front of the vehicle 1 on the merging destination lane L1 traveling in parallel, without excessively decelerating to merge behind the vehicle 1 on the merging destination lane L1. The vehicle on the merging origin lane L2 already preceding at the time of traveling in parallel is able to smoothly merge by being let into the road in front of the vehicle 1 on the merging destination lane L1 traveling in parallel.

In contrast, in a case where the front end of the vehicle on the merging origin lane L2 traveling in parallel is located not in front of but behind that of the vehicle 1 on the merging destination lane L1, the ECU 44 serving as the selection unit refrains from selecting the vehicle on the merging origin lane L2 as the control target vehicle for the vehicle 1 on the merging destination lane L1 traveling in parallel. On the basis of the control by the ECU 44 serving as the traveling control unit, the vehicle 1 on the merging destination lane L1 refrains from executing the control of allowing the vehicle on the merging origin lane L2 to merge immediately in front of the own vehicle on the merging destination lane L1. This allows the vehicle on the merging origin lane L2 to merge behind the vehicle 1 on the merging destination lane L1 traveling in parallel.

Such merging after parallel traveling may favorably match what the driver determines for merging, and tends to give no feeling of strangeness to the driver.

In the example embodiment, the traveling control at the time of merging is switched on the basis of the comparison between the respective front-rear positions of the front end of the vehicle 1 on the merging destination lane L1 and the front end of the vehicle on the merging origin lane L2. This makes it possible to achieve smooth merging while reducing the feeling of strangeness given to the driver.

The vehicle 1 according to the example embodiment is able to autonomously execute, in the own vehicle, the control in a case of traveling on the merging destination lane L1 of the merging section.

This makes the driver of the vehicle 1 and the driver of the other vehicle 2 less likely to feel strange about such traveling control based on automatic driving. In addition, the vehicle 1 and the other vehicle 2 are able to smoothly merge.

The example embodiment above describes the merging traveling control taking, as an example, a case where the vehicle 1 under automatic driving is traveling on the merging destination lane L1 of the merging section. In another example, the vehicle 1 under automatic driving may travel on the merging origin lane L2 of the merging section.

Figure 10:
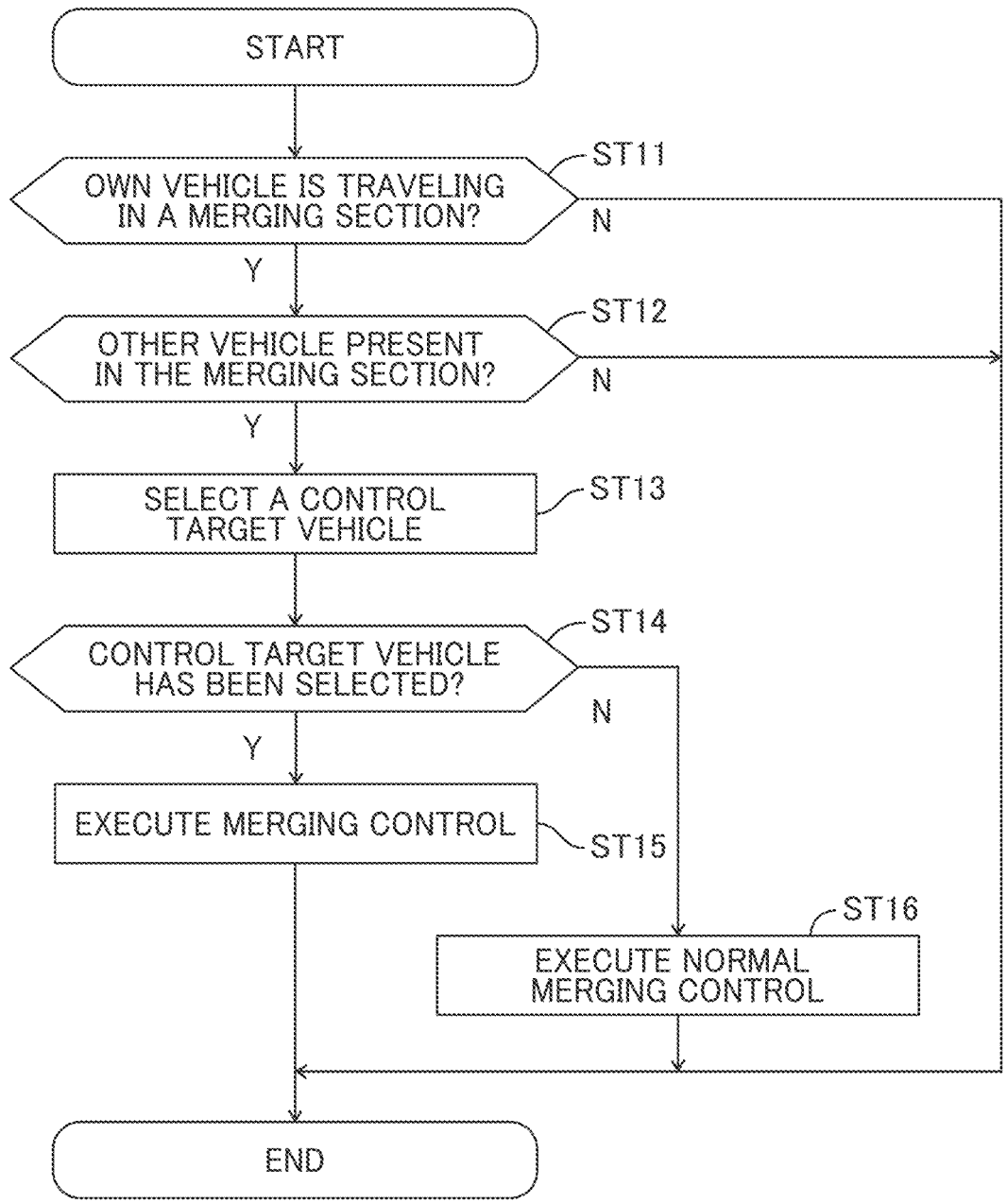
FIG. 10 is a flowchart illustrating merging traveling control also applicable to a case where the vehicle travels on a merging origin lane of a merging section.

FIG. 10 is a flowchart illustrating merging traveling control also applicable to a case where the vehicle 1 travels on the merging origin lane L2 of the merging section.

The merging traveling control in FIG. 10 may favorably correspond to the merging traveling control in FIG. 7.

In step ST11, the ECU 44 may determine whether the own vehicle is traveling in a merging section. The ECU 44 may determine, for example, on the basis of the position information of the own vehicle and the high-precision map data, whether the own vehicle is traveling in a merging section in the high-precision map data.

In addition, the ECU 44 may determine on which lane of the merging section in the high-precision map data the own vehicle is traveling, by comparing a road shape such as a lane boundary and a viewpoint position included in the captured image obtained by the vehicle outside camera 26, with information on a road shape at the current location in the high-precision map data. For example, in a case where the own vehicle is traveling on the merging destination lane L1, the merging origin lane L2 may serve as a parallel running lane. Conversely, in a case where the own vehicle is traveling on the merging origin lane L2, the merging destination lane L1 may serve as a parallel running lane.

If the own vehicle is not traveling in a merging section (step ST11: N), the ECU 44 may end this control. If the own vehicle is traveling in a merging section (step ST11: Y), the ECU 44 may cause the flow to proceed to step ST12.

In step ST12, the ECU 44 may determine whether the other vehicle 2 traveling on a different parallel running lane from the own vehicle is present in the merging section. In the captured image obtained by the vehicle outside camera 26, the predetermined angle-of-view range may be imaged basically with respect to the forward side in the traveling direction of the own vehicle. In a case where the own vehicle is provided with multiple vehicle outside cameras 26, the ECU 44 is able to also acquire images captured in sideward directions and the backward direction from the own vehicle. The ECU 44 may determine presence or absence of the other vehicle 2 traveling on the parallel running lane, on the basis of an image component of the parallel running lane included in these captured images obtained by the vehicle outside camera 26. A small-sized vehicle, an ordinary-sized vehicle, or the large-sized vehicle 3 may be included in the captured image with a given size and shape. The ECU 44 may analyze a portion different from a road surface included in the image to thereby detect the other vehicle 2 traveling on the parallel running lane. If the other vehicle 2 traveling on the parallel running lane is not detected (step ST12: N), the ECU 44 may end this control. If the other vehicle 2 traveling on the parallel running lane is detected (step ST12: Y), the ECU 44 may cause the flow to proceed to step ST13.

In step ST13, the ECU 44 may select a control target vehicle to be the target of merging control by the own vehicle, out of vehicles traveling on the parallel running lane, on the basis of the front-rear relationship with respect to the front end of each vehicle including the own vehicle. The ECU 44 may preferentially select the vehicle whose front end is on the forward side, out of the multiple vehicles traveling on the multiple lanes of the merging section, with respect to the front end of each vehicle.

For example, in a case where the own vehicle is traveling on the merging origin lane L2, the ECU 44 may select, with respect to the own vehicle traveling on the merging origin lane L2, the other vehicle 2 whose front end is forward of the front end of the own vehicle as the control target vehicle, out of the one or more other vehicles 2 traveling on the merging destination lane L1. In a case where the other vehicle 2 whose front end is forward of the front end of the own vehicle is absent on the merging destination lane L1, the ECU 44 may refrain from selecting a control target vehicle.

In another example, in a case where the own vehicle is traveling on the merging destination lane L1, the ECU 44 may select, with respect to the own vehicle traveling on the merging destination lane L1, the other vehicle 2 whose front end is forward of the front end of the own vehicle as the control target vehicle, out of the one or more other vehicles 2 traveling on the merging origin lane L2. In a case where the other vehicle 2 whose front end is forward of the front end of the own vehicle is absent on the merging origin lane L2, the ECU 44 may refrain from selecting a control target vehicle.

In step ST14, the ECU 44 may determine whether a control target vehicle has been selected. If the other vehicle 2 has been selected by the process of step ST13 (step ST14: Y), the ECU 44 may determine that a control target vehicle has been selected, and cause the flow to proceed to step ST15. If the other vehicle 2 has not been selected by the process of step ST13 (step ST14: N), the ECU 44 may determine that a control target vehicle has not been selected, and cause the flow to proceed to step ST16.

In step ST15, the ECU 44 may execute merging control to locate the control target vehicle immediately in front of the own vehicle.

For example, in a case where the own vehicle is traveling on the merging destination lane L1, the ECU 44 may execute control of keeping or reducing the speed to allow the control target vehicle to merge immediately in front of the own vehicle. This enables the other vehicle 2 traveling on the merging origin lane L2 to travel and merge from the merging origin lane L2 to the merging destination lane L1 in front of the own vehicle.

For example, in a case where the own vehicle is traveling on the merging origin lane L2, the ECU 44 may execute control of keeping or reducing the speed to merge immediately behind the control target vehicle. The ECU 44 may also execute control of moving from the merging origin lane L2 to the merging destination lane L1. This enables the vehicle 1 serving as the own vehicle to travel and merge from the merging origin lane L2 to the merging destination lane L1 behind the other vehicle 2 traveling on the merging destination lane L1.

Upon the end of merging, the ECU 44 may end this control.

In step ST16, because a control target vehicle is absent, the ECU 44 may execute normal merging control similar to that in a case where the other vehicle 2 is absent on the parallel running lane.

For example, in a case where the own vehicle is traveling on the merging destination lane L1, the ECU 44 may execute control of keeping the speed, assuming that the other vehicle 2 is absent on the merging origin lane L2. This enables the other vehicle 2 traveling on the merging origin lane L2 to travel and merge from the merging origin lane L2 to the merging destination lane L1 behind the own vehicle.

For example, in a case where the own vehicle is traveling on the merging origin lane L2, the ECU 44 may execute control of keeping the speed, assuming that the other vehicle 2 is absent on the merging destination lane L1. The ECU 44 may also execute control of moving from the merging origin lane L2 to the merging destination lane L1. This enables the vehicle 1 serving as the own vehicle to travel and merge from the merging origin lane L2 to the merging destination lane L1 in front of the other vehicle 2 traveling on the merging destination lane L1.

Upon the end of merging, the ECU 44 may end this control.

Note that, in step ST15 or step ST16, the ECU 44 may determine whether merging of the control target vehicle has ended, to determine the end of the merging control.

Second Example Embodiment

Described next is a second example embodiment of the disclosure. The following description includes description of differences from the foregoing example embodiment.

Features similar to those in the foregoing example embodiment are denoted with the same reference signs as those in the foregoing example embodiment, and descriptions thereof are omitted.

Figure 11:
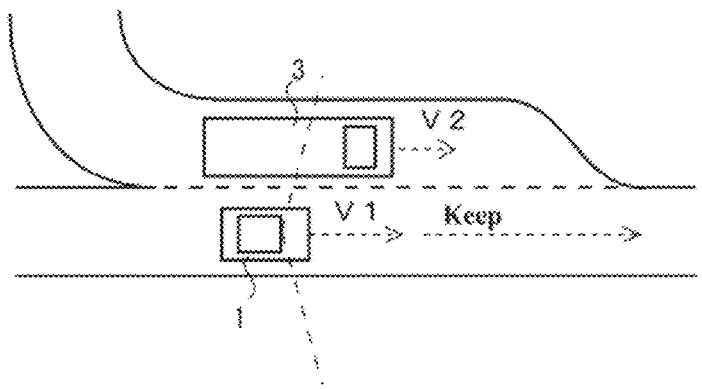
FIG. 11 is an explanatory diagram illustrating a traveling state in a merging section to which merging traveling control according to one example embodiment of the disclosure is applicable.

FIG. 11 is an explanatory diagram illustrating a traveling state in a merging section to which merging traveling control according to the second example embodiment of the disclosure is applicable. FIG. 11 corresponds to the third traveling state in FIG. 9.

In FIG. 11, the vehicle 1 serving as the own vehicle that executes the merging traveling control may be traveling on the merging destination lane L1 at a speed V1 in the merging section.

In contrast, the large-sized vehicle 3 may be traveling on the merging origin lane L2 at a speed V2 in the merging section.

The large-sized vehicle 3 may not only be longer in the front-rear direction than a small-sized vehicle and an ordinary-sized vehicle, but also have difficulty in speed adjustment by acceleration or deceleration. The large-sized vehicle 3 long in the front-rear direction can be unable to sufficiently accelerate or decelerate in the merging section. In this case, even if the vehicle 1 on the merging destination lane L1 selects the large-sized vehicle 3 on the merging origin lane L2 as the control target vehicle and decelerates for merging traveling control, the vehicle 1 can be unable to sufficiently decelerate to allow the large-sized vehicle 3 to safely merge in front of the vehicle 1. Such an event is more likely to occur, for example, in a case where the speed V1 of the vehicle 1 is higher than the speed V2 of the large-sized vehicle 3.

Figure 12:
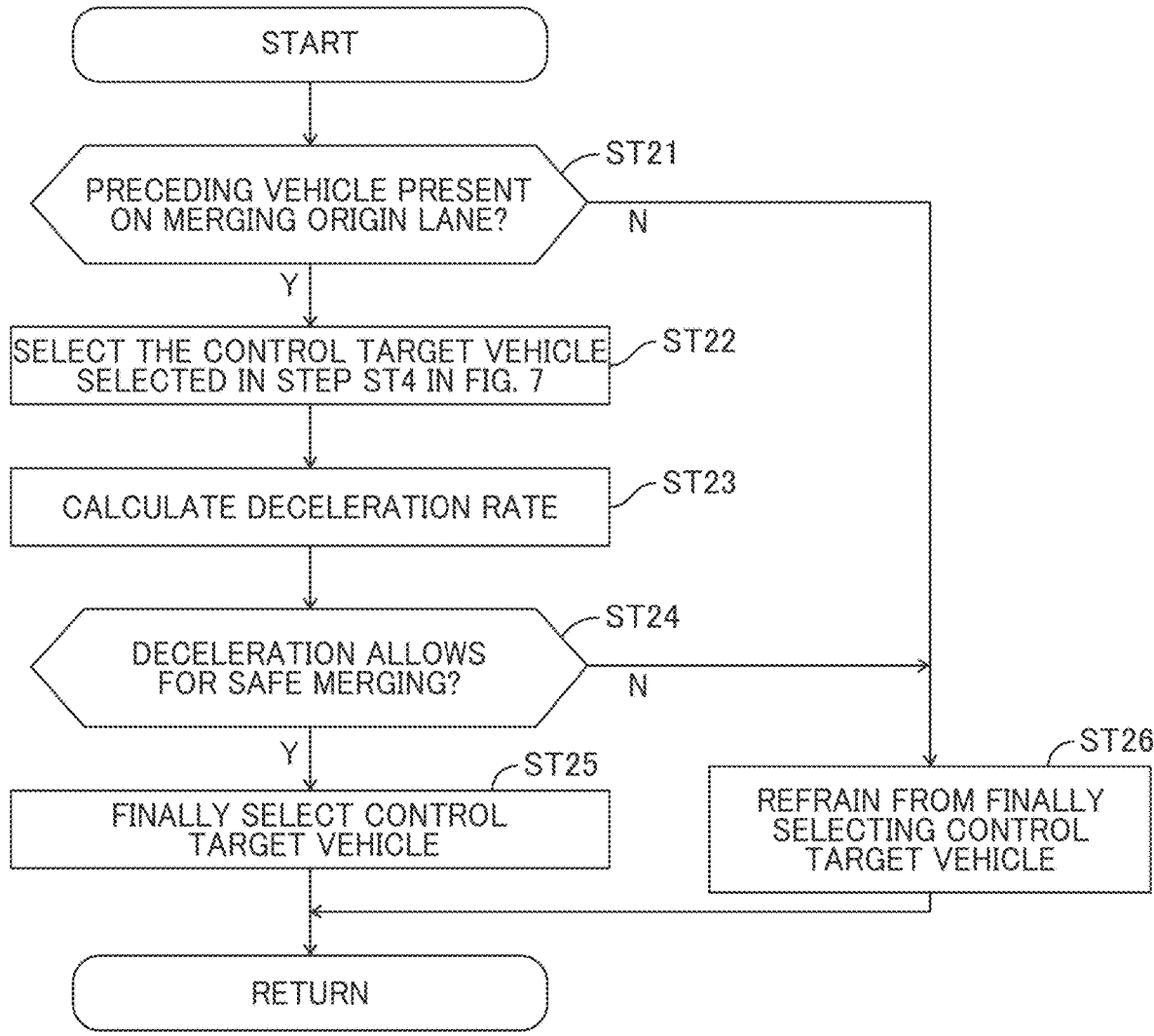
FIG. 12 is a flowchart illustrating control target vehicle selection control in the merging traveling control according to one example embodiment.

FIG. 12 is a flowchart illustrating control target vehicle selection control in the merging traveling control according to the second example embodiment of the disclosure.

The ECU 44 of the vehicle 1 that executes the merging traveling control in FIG. 7 may execute the control target vehicle selection control in FIG. 12, as a part of the process of step ST4.

Note that, also in a case of executing the merging traveling control in FIG. 10, the ECU 44 may execute the control target vehicle selection control in FIG. 12, as a part of the process of step ST13.

In step ST21, the ECU 44 may determine whether a preceding vehicle is present on the merging origin lane L2 running in parallel by determination with respect to the front end. The ECU 44 may select a control target vehicle, on the basis of the front-rear relationship with respect to the front end of each vehicle, by the basic process of step ST4 in FIG. 7 described above. If a control target vehicle has been selected (step ST21: Y), the ECU 44 may determine that a preceding vehicle is present on the merging origin lane L2 running in parallel by determination with respect to the front end, and cause the flow to proceed to step ST22. If a control target vehicle has not been selected (step ST21: N), the ECU 44 may cause the flow to proceed to step ST26.

In step ST22, the ECU 44 may provisionally select the control target vehicle selected by the basic process of step ST4 in FIG. 7 described above as a candidate for a control target vehicle.

In step ST23, the ECU 44 may calculate a deceleration rate for letting in the provisionally selected control target vehicle in front of the own vehicle. In the calculation, the ECU 44 may calculate, instead of a deceleration rate at the ending point PE of the merging section, a deceleration rate at an offset point before the ending point PE of the merging section. An offset amount may be, for example, three times the front-rear length of the large-sized vehicle 3 that merges, or a distance movable in three seconds at the current vehicle speed of the own vehicle.

The ECU 44 may calculate a deceleration rate A1, for example, on the basis of Expression 1 given below. In Expression 1, V1 may be the current speed of the own vehicle. V2 may be the current speed of the provisionally selected control target vehicle. Lm may be a remaining distance before the offset point before the ending point PE of the merging section. On the basis of Expression 1, the ECU 44 is able to calculate the deceleration rate A1 desired for the own vehicle to decelerate to the vehicle speed of the provisionally selected control target vehicle before the offset point. Note that "*2" may represent a square.

$$A1=(V1*2-V2*2)/(2\times Lm) \quad \text{Expression 1}$$

In step ST24, the ECU 44 may determine whether deceleration is possible to allow for safe merging in the merging section. For example, the ECU 44 may compare the deceleration rate A1 of the own vehicle at the earlier point calculated in step ST23 with a threshold A2 for the deceleration rate A1. The threshold A2 to be used here may be a deceleration rate at which the occupant does not feel strange about the deceleration. In another example, the threshold A2 to be used here may be, in a case where there is a possibility that a vehicle currently subsequent to the own vehicle come into contact with the own vehicle from behind, a deceleration rate at which the subsequent vehicle is unlikely to come into contact from behind.

If the deceleration rate A1 of the own vehicle is equal to or greater than the threshold A2 (step ST24: N), the ECU 44 may cause the flow to proceed to step ST26, to refrain from executing deceleration for letting in the provisionally selected control target vehicle in front of the own vehicle. If the deceleration rate A1 of the own vehicle is less than the threshold A2 (step ST24: Y), the ECU 44 may cause the flow to proceed to step ST25, to execute the deceleration for letting in the provisionally selected control target vehicle in front of the own vehicle.

In step ST25, the ECU 44 may finally select the control target vehicle provisionally selected in step ST22 as a definitive control target vehicle. Thereafter, the ECU 44 may end this control. In this case, the ECU 44 may execute the immediately front merging control in step ST6 in FIG. 7, and execute deceleration control for allowing the large-sized vehicle 3 to merge in front of the own vehicle. The large-sized vehicle 3 is able to move and merge from the merging origin lane L2 to the merging destination lane L1 in front of the vehicle 1 that has decelerated, as illustrated in FIG. 9.

In step ST26, the ECU 44 may refrain from finally selecting the control target vehicle provisionally selected in step ST22 as a definitive control target vehicle. In this case, a control target vehicle may be absent. The ECU 44 may cause the vehicle 1 to keep traveling on the merging destination lane L1 of the merging section while keeping the current speed, as illustrated in FIG. 11, without executing the immediately front merging control in step ST6 in FIG. 7. In another example, the ECU 44 may cause the vehicle 1 to travel on the merging destination lane L1 of the merging section while accelerating. The large-sized vehicle 3 is able to move and merge from the merging origin lane L2 to the merging destination lane L1 behind the vehicle 1 traveling on the merging destination lane L1 while keeping the speed.

In the example embodiment, when selecting the control target vehicle, the ECU 44 serving as the selection unit may first compare the respective front-rear positions of the front end of the vehicle 1 serving as the own vehicle on the merging destination lane L1 and the front end of the large-sized vehicle 3 serving as the other vehicle 2 on the merging origin lane L2. In the example embodiment, the ECU 44 serving as the selection unit may provisionally select the large-sized vehicle 3 located forward of the own vehicle as the control target vehicle.

Thereafter, in the example embodiment, the ECU 44 serving as the selection unit may determine whether the own vehicle is able to decelerate, at the earlier point before the ending point PE of the merging section, to a speed equal to or less than the speed of the provisionally selected large-sized vehicle 3 within a normal deceleration rate range that prevents abrupt deceleration. In a case where the own vehicle is able to decelerate, in the example embodiment, the ECU 44 serving as the selection unit may finally select the provisionally selected large-sized vehicle 3 on the merging origin lane L2 as the control target vehicle. In contrast, in a case where the own vehicle is unable to decelerate, in the example embodiment, the ECU 44 serving as the selection unit may refrain from finally selecting the provisionally selected large-sized vehicle 3 on the merging origin lane L2 as the control target vehicle.

Thus, in the example embodiment, even if the front end of the large-sized vehicle 3 on the merging origin lane L2 is located forward of the front end of the own vehicle on the merging destination lane L1, the ECU 44 serving as the selection unit may select the large-sized vehicle 3 as the control target vehicle to be allowed to merge in front of the own vehicle, only in a case where the own vehicle is able to sufficiently decelerate to be located behind the large-sized vehicle 3. In a case where the own vehicle is unable to sufficiently decelerate, the large-sized vehicle 3 on the merging origin lane L2 may merge behind the own vehicle, even if the front end of the large-sized vehicle 3 is located forward of that of the own vehicle.

This makes the driver of the vehicle 1 and the driver of the large-sized vehicle 3 serving as the other vehicle 2 less likely to feel strange about such traveling control based on automatic driving. In addition, the vehicle 1 and the large-sized vehicle 3 are able to smoothly merge.

Note that, in the example embodiment, in the processes of step ST23 to step ST24 in FIG. 12, the ECU 44 may calculate the deceleration rate in a case where the own vehicle decelerates to the speed of the provisionally selected control target vehicle, and compare the deceleration rate with the threshold.

In another example, the ECU 44 may calculate and compare a speed in a case where the own vehicle decelerates in the merging section before the offset earlier point, and a speed in a case where the provisionally selected control target vehicle decelerates in the merging section. In this case, the ECU 44 may calculate the speed at the earlier point in a case where the own vehicle decelerates at a predetermined deceleration rate from the current speed V1 of the own vehicle. The ECU 44 may also calculate the speed at the earlier point in a case where the large-sized vehicle 3 decelerates at a predetermined deceleration rate from the current speed V2 of the large-sized vehicle 3. The predetermined deceleration rate of the own vehicle may be a maximum deceleration rate within a range that prevents abrupt deceleration causing the driver to feel strange about the deceleration. The deceleration rate of the large-sized vehicle 3 may also be a similar deceleration rate, but a value smaller than the deceleration rate of the own vehicle may basically be estimated and used. The latest speed or deceleration rate of the large-sized vehicle 3 may be acquired from the large-sized vehicle 3 by the external communication apparatus 17 performing vehicle-to-vehicle (V2V) communication with the large-sized vehicle 3. The speed of the large-sized vehicle 3 may also be estimated from a change in an image position of the large-sized vehicle 3 in the captured image obtained by the vehicle outside camera 26.

In this modification example, the ECU 44 may determine, in step ST24, whether deceleration is possible to allow for safe merging in the merging section. For example, the ECU 44 may compare the speed of the own vehicle at the earlier point calculated in step ST23 and the speed of the large-sized vehicle 3. If the speed of the own vehicle at the earlier point is not equal to or less than the speed of the large-sized vehicle 3, for example, the ECU 44 may determine that deceleration is not possible, and cause the flow to proceed to step ST26. In contrast, if the speed of the own vehicle at the earlier point is equal to or less than the speed of the large-sized vehicle 3, the ECU 44 may determine that deceleration is possible, and cause the flow to proceed to step ST25.

Even in the process in this modification example, the ECU 44 is able to determine whether the vehicle on the merging destination lane is able to decelerate, at the earlier point before the ending point of the merging section, to let in the provisionally selected vehicle on the merging origin lane in front of the own vehicle.

Note that, in a case of the process in this modification example, if the provisionally selected vehicle on the merging origin lane actually accelerates, the ECU 44 can be unable to select a process to address the acceleration. Such an event is unlikely to be caused in the process in the example embodiment described above.

Third Example Embodiment

Described next is a third example embodiment of the disclosure. The following description includes description of differences from the foregoing example embodiment. Features similar to those in the foregoing example embodiment are denoted with the same reference signs as those in the foregoing example embodiment, and descriptions thereof are omitted.

The vehicle 1 may merge not only in a merging section set on a road, but also in a case of lane regulation due to an event such as road construction. In this case, it is likely that a merging section is not set in, for example, the high-precision map data.

A merging section set on a road is not designed to allow the vehicle 1 under automatic driving to merge sufficiently safely. The length L of a settable merging section may be limited by a factor such as a terrain. This results in a very short merging section in some cases. In addition, merging may occur not only in a merging section set on a road, but also in a place such as an intersection without a traffic light, an entrance of a tollgate, or an entrance of a parking lot. In such a case, even if the vehicle 1 under automatic driving starts merging traveling control after actually entering a state of traveling in a merging section, it can be difficult to achieve safe and smooth merging.

Figure 13:
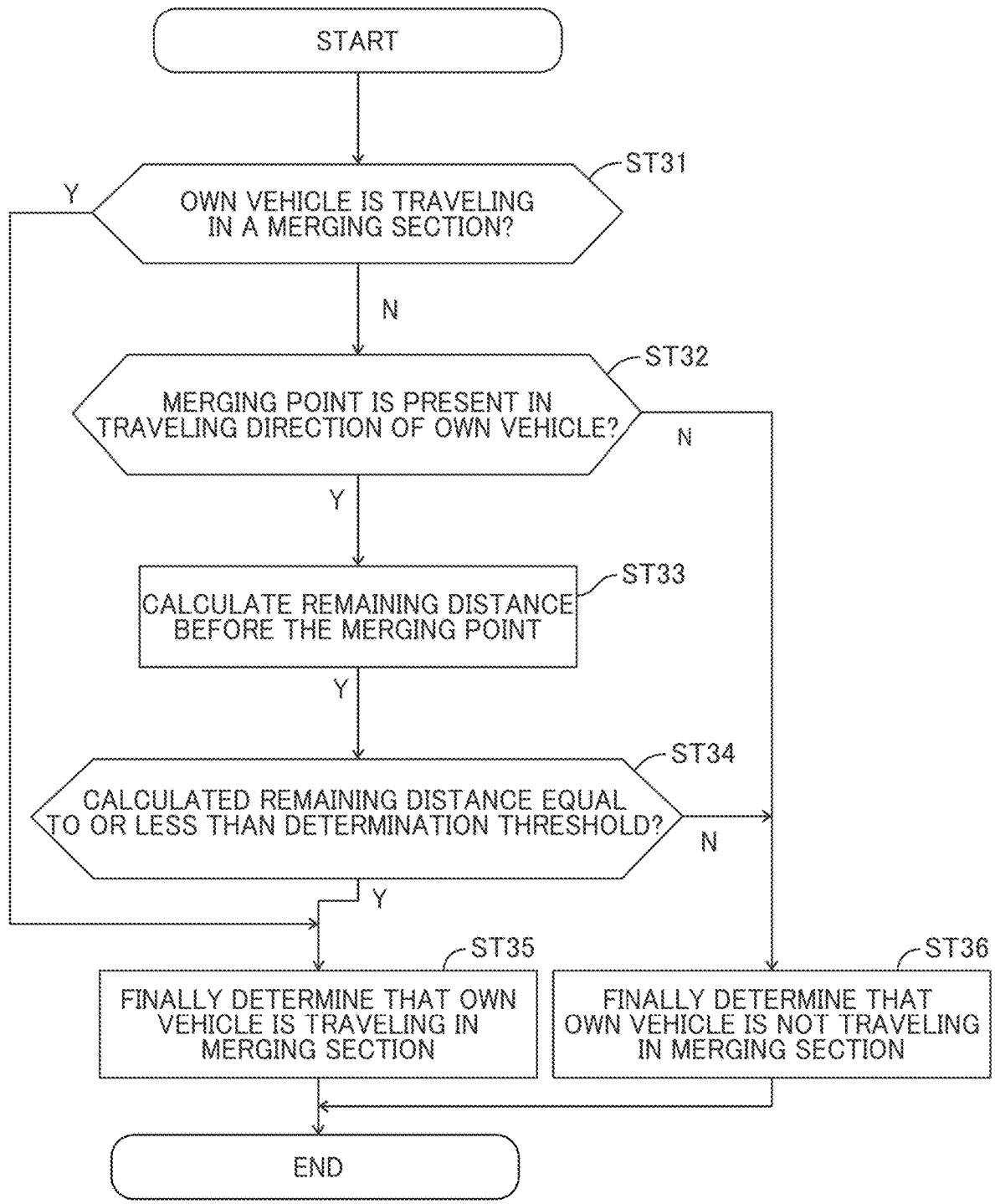
FIG. 13 is a flowchart illustrating merging section traveling determination control in merging traveling control according to one example embodiment of the disclosure.

FIG. 13 is a flowchart illustrating merging section traveling determination control in merging traveling control according to the third example embodiment of the disclosure.

The ECU 44 of the vehicle 1 that executes the merging traveling control in FIG. 7 may execute the merging section traveling determination control in FIG. 13, as a part of the process of step ST1.

Note that, also in a case of executing the merging traveling control in FIG. 10, the ECU 44 may execute the merging section traveling determination control in FIG. 13, as a part of the process of step ST11.

In step ST31, the ECU 44 may determine whether the own vehicle is traveling in a merging section. The ECU 44 may determine whether the own vehicle is actually traveling in a merging section by a process similar to that of step ST1 in FIG. 7. If the own vehicle is actually traveling in a merging section (step ST31: Y), the ECU 44 may cause the flow to proceed to step ST35. Otherwise (step ST31: N), the ECU 44 may cause the flow to proceed to step ST32.

In step ST32, the ECU 44 may determine whether, in a state of not traveling in a merging section, a merging point is present in the traveling direction of the own vehicle. The ECU 44 may determine whether a merging point is present in the traveling direction from the current position on the basis of, for example, the high-precision map data, and traffic regulation information acquired by the external communication apparatus 17 from the server 31. The merging point may include a merging section set on a road and included in the high-precision map data. If a merging point is present in the traveling direction (step ST32: Y), the ECU 44 may cause the flow to proceed to step ST33. If a merging point is absent in the traveling direction (step ST32: N), the ECU 44 may cause the flow to proceed to step ST36.

In step ST33, the ECU 44 may calculate a remaining distance before the merging point. In a case where the merging point is a merging section, the ECU 44 may calculate the remaining distance before the ending point PE of the merging section.

In step ST34, the ECU 44 may compare the remaining distance calculated in step ST33 with a determination threshold. The determination threshold may be, for example, a distance in which the own vehicle is able to stop at a deceleration rate that gives no feeling of strangeness to the driver from the current vehicle speed of the own vehicle. If the remaining distance is equal to or less than the determination threshold (step ST34: Y), the ECU 44 may cause the flow to proceed to step ST35. If the remaining distance is greater than the determination threshold (step ST34: N), the ECU 44 may cause the flow to proceed to step ST36.

In step ST35, the ECU 44 may finally determine that the own vehicle is traveling in a merging section. Thereafter, the ECU 44 may end this control. In this case, the ECU 44 may determine that the own vehicle is traveling in a merging section in the merging traveling control in step ST1 in FIG. 7, and cause the flow to proceed to step ST2.

In step ST36, the ECU 44 may finally determine that the own vehicle is not traveling in a merging section. Thereafter, the ECU 44 may end this control. In this case, the ECU 44 may determine that the own vehicle is not traveling in a merging section in the merging traveling control in step ST1 in FIG. 7, and end the control in FIG. 7.

Figure 14:
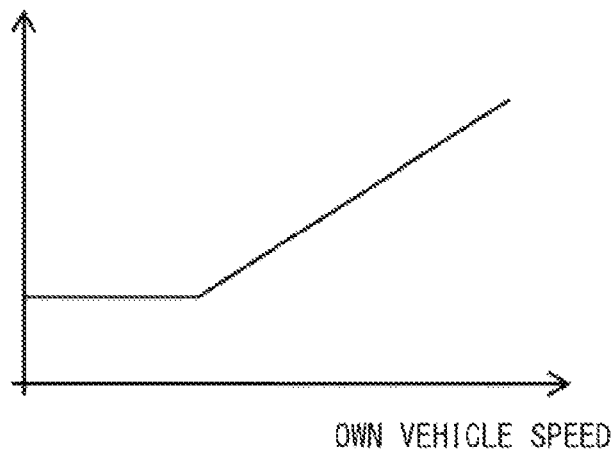
FIG. 14 is an explanatory diagram illustrating a determination threshold for a merging section, corresponding to a remaining distance before an ending point of the merging section, and an own vehicle speed.

FIG. 14 is an explanatory diagram illustrating the determination threshold for a merging section, corresponding to the remaining distance before the ending point of the merging section, and the own vehicle speed.

In FIG. 14, the horizontal axis may represent the own vehicle speed. The vertical axis may represent the determination threshold for the remaining distance before the merging point. The determination threshold in FIG. 14 may be a constant value up to a predetermined speed. At a speed equal to or greater than the predetermined speed, the determination threshold may increase depending on the speed.

By using such a determination threshold, the ECU 44 of the vehicle 1 under automatic driving is able to determine that the own vehicle is traveling in a merging section not only in a case where the own vehicle is actually traveling in a merging section, but also in a case where the own vehicle is traveling within a range of a given distance from a merging point. The ECU 44 is able to start the merging traveling control before actually starting to travel in the merging section.

As described above, in the example embodiment, the ECU 44 serving as the selection unit may select the control target vehicle, for example, from the one or more vehicles on the merging origin lane L2 including the vehicle traveling before a point where a merging section starts on a road. As a result, even in a case where the merging section is short, the vehicle 1 is able to start the control for merging before the merging section. In a case of executing the merging traveling control only in a merging section, the vehicle 1 tends to undergo abrupt control if the merging section is short. Such an event is unlikely to occur in the example embodiment.

In addition, in the example embodiment, it is also possible to execute the merging traveling control regarding a merging point not set on a road. In the example embodiment, it is possible to select the control target vehicle and execute the merging traveling control, regarding, as well as a merging section set on a road, at least a point where merging occurs, such as an intersection without a traffic light, an entrance of a tollgate, or an entrance of a parking lot.

Fourth Example Embodiment

Described next is a fourth example embodiment of the disclosure. The following description includes description of differences from the foregoing example embodiment. Features similar to those in the foregoing example embodiment are denoted with the same reference signs as those in the foregoing example embodiment, and descriptions thereof are omitted.

It is not always the case that only the vehicle 1 serving as the own vehicle and the other vehicle 2 are present in the merging section as described above. For example, multiple other vehicles may be traveling on the merging origin lane L2 in some cases. The other vehicle 2 other than the vehicle 1 serving as the own vehicle may be traveling on the merging destination lane L1 in some cases. Traffic congestion may occur in the merging section, for example, in a case where vehicles are concentrated in the merging section. Even in such a case, the vehicle 1 under automatic driving is to execute smooth merging, without giving a feeling of strangeness to the driver.

Figure 15:
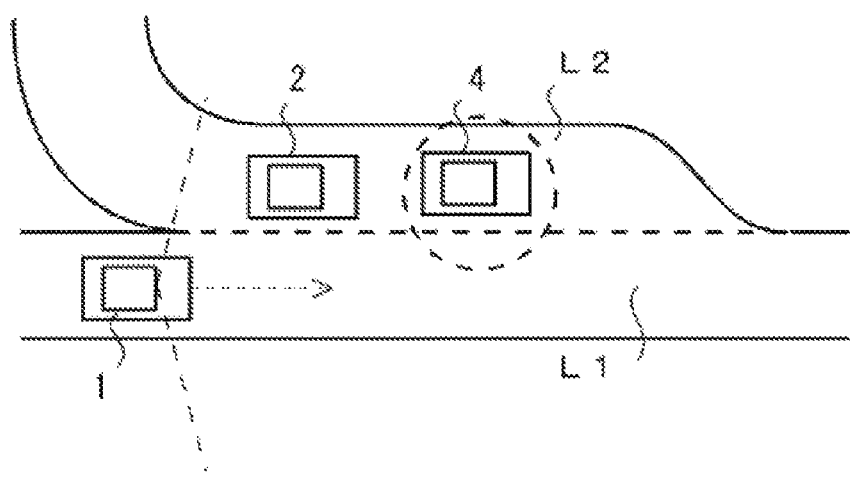
FIG. 15 is an explanatory diagram illustrating a traveling state in a merging section based on merging traveling control according to one example embodiment of the disclosure.

FIG. 15 is an explanatory diagram illustrating a traveling state in a merging section based on merging traveling control according to the fourth example embodiment of the disclosure.

In FIG. 15, the vehicle 1 serving as the own vehicle that executes the merging traveling control may be traveling alone on the merging destination lane L1 in the merging section.

In contrast, multiple other vehicles, including the other vehicle 2 and a merging preceding vehicle 4 traveling in front of the other vehicle 2, may be traveling on the merging origin lane L2 of the merging section.

In this case, if the ECU 44 of the vehicle 1 serving as the own vehicle traveling on the merging destination lane L1 executes the merging traveling control according to the foregoing example embodiment, the other vehicle 2 corresponding to the second vehicle from the ending point PE of the merging section may be basically selected as the control target vehicle, because the other vehicle 2 corresponding to the second vehicle is preceding the own vehicle. As a result, the other vehicles traveling on the merging origin lane L2 may collectively merge in front of the own vehicle.

However, if the other vehicles traveling on the merging origin lane L2 collectively merge, the traveling of the vehicle 1 that has been traveling on the merging destination lane L1 can be hindered. For example, in a case where the merging section is congested, only the vehicles traveling on the merging origin lane L2 moving ahead can give stress to the driver of the vehicle 1 that has been traveling on the merging destination lane L1. In traveling in the congested merging section, it is assumed to be effective for the vehicle on the merging origin lane L2 and the vehicle 1 on the merging destination lane L1 merge one by one in order before the ending point of the merging section.

Figure 16:
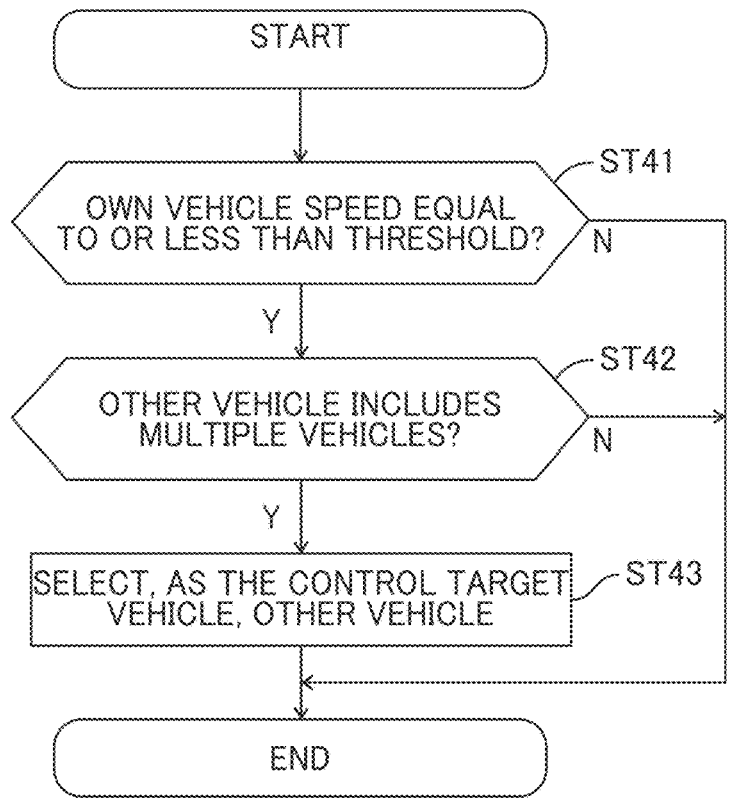
FIG. 16 is a flowchart illustrating control target vehicle selection control in the merging traveling control according to one example embodiment.

FIG. 16 is a flowchart illustrating control target vehicle selection control in the merging traveling control according to the fourth example embodiment of the disclosure.

The ECU 44 of the vehicle 1 that executes the merging traveling control in FIG. 7 may execute the control target vehicle selection control in FIG. 16, as a part of the process of step ST4.

Note that, also in a case of executing the merging traveling control in FIG. 10, the ECU 44 may execute the control target vehicle selection control in FIG. 16, as a part of the process of step ST13.

In step ST41, the ECU 44 may compare the own vehicle speed with a threshold. The threshold to be compared with the own vehicle speed may be a threshold for determination of whether the merging section is congested, and may be, for example, 20 km/h. If the own vehicle speed is equal to or less than the threshold (step ST41: Y), the ECU 44 may cause the flow to proceed to step ST42. If the own vehicle speed is greater than the threshold (step ST41: N), the ECU 44 may end this control. In this case, the ECU 44 may select the control target vehicle in accordance with the order of entry to the uncongested merging section. In the case of FIG. 15, the other vehicle 2 traveling behind the merging preceding vehicle 4 may be selected as the control target vehicle. The ECU 44 of the vehicle 1 serving as the own vehicle may execute traveling control for allowing the other vehicle 2 to merge in front of the own vehicle.

In step ST42, the ECU 44 may determine whether the other vehicle 2 preceding on the merging origin lane L2 running in parallel in the congested merging section includes multiple vehicles. Multiple other vehicles preceding on the congested parallel running lane may be imaged in the captured image obtained by the vehicle outside camera 26. The ECU 44 may determine, on the basis of the captured image, whether the other vehicle 2 preceding on the congested parallel running lane includes multiple vehicles. If multiple vehicles preceding and selectable as the control target vehicle are present on the congested merging origin lane L2 (step ST42: Y), the ECU 44 may cause the flow to proceed to step ST43. If the vehicle preceding and selectable as the control target vehicle on the congested merging origin lane L2 is one vehicle (step ST42: N), the ECU 44 may end this control. In this case, the ECU 44 may select the other vehicle 2 preceding on the congested parallel running lane as the control target vehicle. The ECU 44 of the vehicle 1 serving as the own vehicle may execute traveling control for allowing the other vehicle 2 to merge in front of the own vehicle.

In step ST43, the ECU 44 may select, as the control target vehicle, the other vehicle 2 on the parallel running lane in the same order as the own vehicle from the ending point PE of the congested merging section. In this case, the ECU 44 may select, out of the multiple other vehicles preceding on the congested parallel running lane, the other vehicle 2 on the parallel running lane in the same order as the own vehicle from the ending point PE of the merging section, as the control target vehicle. For example, in a case where the own vehicle is the first vehicle from the ending point PE of the merging section, the ECU 44 may select the other vehicle 2 corresponding to the first vehicle on the congested parallel running lane as the control target vehicle. In the case of FIG. 15, the ECU 44 may select, instead of the other vehicle 2 traveling on the merging origin lane L2, the preceding merging preceding vehicle 4 surrounded by a dashed-line circle in FIG. 15 as the control target vehicle. Thereafter, the ECU 44 may end this control. In this case, the ECU 44 may execute traveling control for allowing the merging preceding vehicle 4 preceding on the congested parallel running lane to merge in front of the own vehicle. Thus, in traveling in the congested merging section, the vehicle on the merging origin lane L2 and the vehicle 1 on the merging destination lane L1 are able to merge one by one in order before the ending point of the merging section.

As described above, in the example embodiment, in a case where multiple vehicles 2 selectable as the control target vehicle are present on the merging origin lane L2, the ECU 44 serving as the selection unit may select the vehicle in the same order as the own vehicle from the ending point PE of the merging section, as the control target vehicle. In contrast, if the last vehicle out of the multiple vehicles 2 selectable as the control target vehicle on the merging origin lane L2 is selected as the control target vehicle, for example, all of the multiple vehicles selectable as the control target vehicle on the merging origin lane L2 may merge in front of the own vehicle. This hinders the traveling of the vehicle 1 traveling on the merging destination lane, and makes it difficult to achieve smooth merging. Such an event is unlikely to occur in the example embodiment.

For example, as in the example embodiment, it may be determined beforehand that the speed of the vehicle 1 traveling on the merging destination lane is lower than the threshold. This makes it possible to allow the vehicles to merge near the ending point of the merging section, even in a case where the merging section is long, for example. Thus, in the example embodiment, even in a case where long merging congestion has been caused by lane reduction due to construction, for example, it is possible to allow for smooth merging near the head of the merging line.

Note that, in the example embodiment, in a case of selecting the control target vehicle from multiple other vehicles preceding on the parallel running lane, it may be determined whether the merging section is congested on the basis of the speed of the own vehicle. In another example, the ECU 44 may use the speed of the other vehicle 2 other than the own vehicle, or use a group speed of all these speeds, to determine whether the merging section is congested.

Fifth Example Embodiment

Described next is a fifth example embodiment of the disclosure. The following description includes description of differences from the foregoing example embodiment. Features similar to those in the foregoing example embodiment are denoted with the same reference signs as those in the foregoing example embodiment, and descriptions thereof are omitted.

As illustrated in FIG. 4, the control system 10 of the vehicle 1 configured to execute automatic driving may include the external communication apparatus 17 communicable with the external server 31 via the base station 30. In this case, the server 31 may collect and acquire, from multiple vehicles traveling on a road including a merging section, information regarding the traveling of each vehicle, and generate a traveling control value to be used for traveling control of each vehicle on the basis of the acquired information. In addition, the control system 10 of the vehicle 1 is able to receive and acquire a traveling control value from the server 31, and use the traveling control value for the traveling control of the vehicle 1. In this case, the server 31 may control the traveling of the vehicles traveling in the merging section by remote control or traffic control. In this manner, the server 31 may acquire information regarding the traveling of the vehicles from the vehicles traveling in the merging section. The server 31 may generate, on the basis of the acquired information, a traveling control value to control the traveling of the vehicle 1 traveling on the merging destination lane L1, to cause the control target vehicle to merge immediately in front of the vehicle 1 traveling on the merging destination lane L1.

Figure 17:
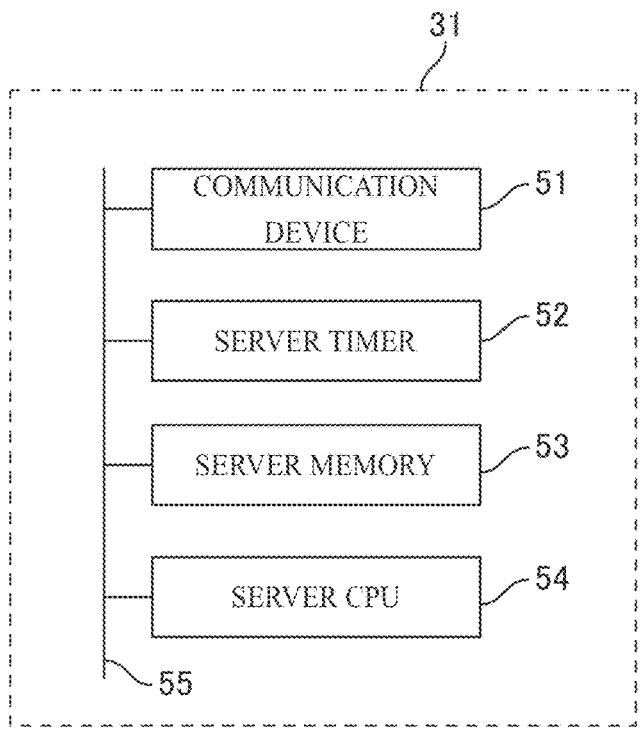
FIG. 17 is an explanatory diagram illustrating a server that controls traveling of the vehicle.

FIG. 17 is an explanatory diagram illustrating the server 31 that controls the traveling of the vehicle 1.

The server 31 in FIG. 17 may include a communication device 51, a server timer 52, a server memory 53, a server CPU 54, and a server bus 55. The communication device 51, the server timer 52, the server memory 53, and the server CPU 54 may be coupled to the server bus 55.

The communication device 51 may be coupled to a communication network such as the Internet. The communication device 51 may transmit and receive information to and from, for example, the vehicle 1 traveling on a road, via the base station 30 coupled to the communication network, for example. In one embodiment, the communication device 51 may serve as a "communicator" configured to communicate with the vehicle 1 to control or assist the traveling of the vehicle 1.

The server timer 52 may measure a time and a time period. The time of the server timer 52 may be calibrated by a time based on radio waves from the unillustrated GNSS satellites. The time of the server timer 52 in this case may synchronize with the time of the vehicle 1.

The server memory 53 may hold a program to be executed by the server CPU 54, and data. The server memory 53 may include, for example, a nonvolatile semiconductor memory, a hard disk drive (HDD), or a random access memory (RAM).

The server CPU 54 may read the program held by the server memory 53 and execute the program. This enables a server processor to be implemented. The server CPU 54 as the server processor may manage operation of the server 31. The server CPU 54 may serve as the vehicle traveling control apparatus that remotely controls the traveling of the vehicle 1. In one embodiment, the server CPU 54 may serve as a "processor" that generates traveling control information, e.g., a traveling control value, for the vehicle 1 on the basis of at least the information acquired by the communication device 51. In one embodiment, the server CPU 54 as the processor may serve as an "acquisition unit" that acquires, from multiple vehicles traveling in the merging section, information regarding the traveling of the vehicles. In one embodiment, the server CPU 54 as the processor may serve as a "selection unit" that selects the control target vehicle for the vehicle 1 traveling on the merging destination lane L1, out of the vehicles traveling on the merging origin lane of the merging section, by comparing, on the basis of the acquired information, the respective front-rear positions of the front end of the vehicle 1 traveling on the merging destination lane L1 and the front end of the vehicles traveling on the merging origin lane. In one embodiment, the server CPU 54 as the processor may serve as a "traveling control unit" that controls the traveling of the vehicle 1 on the basis of the information acquired by the acquisition unit.

Figure 18:
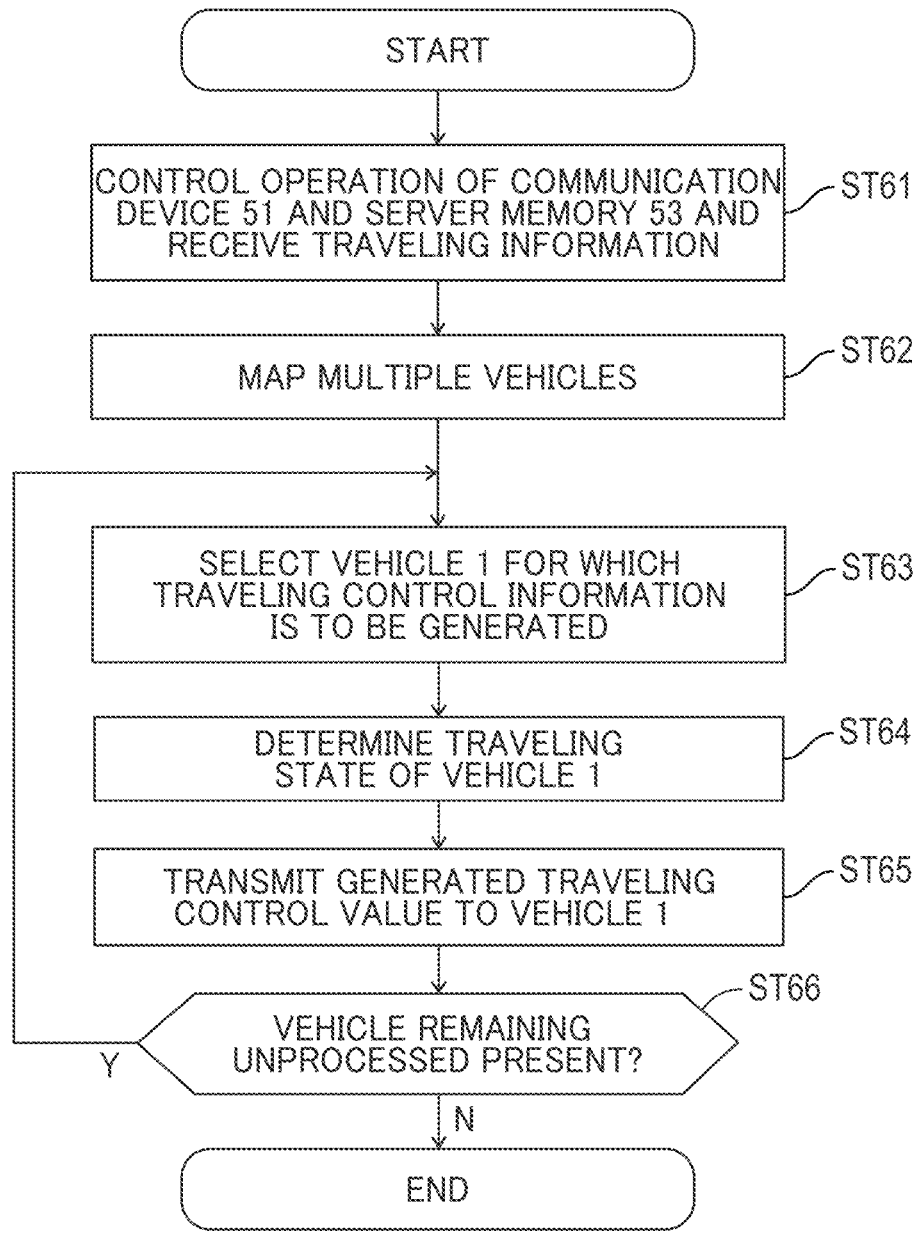
FIG. 18 is a flowchart illustrating traveling control of the vehicle to be performed by the server in FIG. 17.

FIG. 18 is a flowchart illustrating traveling control of the vehicle 1 to be performed by the server 31 in FIG. 17.

The server CPU 54 may repeatedly execute the traveling control of the vehicle 1 in FIG. 18. This enables the server CPU 54 to keep remotely controlling the traveling of the multiple vehicles.

In step ST61, the server CPU 54 may control operation of the communication device 51 and the server memory 53, and receive traveling information. The communication device 51 may receive information on the traveling state of each vehicle from the multiple vehicles. The information received by the communication device 51 may be held by the server memory 53. In this case, the server CPU 54 may acquire the traveling information from the server memory 53. This enables the server CPU 54 to receive the traveling information on the multiple vehicles traveling in the merging section.

In step ST62, the server CPU 54 may map the multiple vehicles on which the traveling information has been acquired, on the high-precision map data, for example, by using the traveling information acquired in step ST61. On the basis of the high-precision map data, the server CPU 54 may generate a diagram for each lane of a road, and map each vehicle on the diagram of the lane on which the vehicle is traveling. The server CPU 54 may map, on the lane diagram, information including the latest current position, the latest traveling direction, and the latest speed of each vehicle. The traveling state of each vehicle may thus be mapped on the corresponding lane diagram. Note that the server CPU 54 may additionally map the vehicle 1 whose traveling is not managed by the server 31, for example, on the basis of a captured image obtained by an intelligent transport system (ITS) camera installed in a place such as an intersection or a merging section of the road. In the lane diagram, it may be assumed that the traveling of the vehicle 1 is limited by lane regulation, for example, in a section in which the vehicle 1 is not continuously mapped. Information on a merging point not included in the high-precision map data may be generated in the lane diagram. In addition, the lane diagram on which the vehicle 1 that has moved to a different lane is mapped may change from that of the lane before the movement to that of the lane after the movement.

In step ST63, the server CPU 54 may select the vehicle 1 for which traveling control information is to be generated.

In step ST64, the server CPU 54 may determine the traveling state of the vehicle 1 selected in step ST63, on the basis of a mapping result obtained in step ST62, and generate a traveling control value corresponding to the traveling state.

In step ST65, the server CPU 54 may transmit the generated traveling control value to the vehicle 1 selected in step ST63, via the communication device 51 and the base station 30. The external communication apparatus 17 of the vehicle 1 may control the traveling of the own vehicle, by using the traveling control value received from the server 31 for traveling control.

In step ST66, the server CPU 54 may determine whether a vehicle remaining unprocessed is present. If a remaining vehicle is present (step ST66: Y), the server CPU 54 may cause the flow to return to step ST63. The server CPU 54 may generate and transmit a traveling control value for each of the multiple vehicles to be remotely controlled, by repeating the processes of step ST63 to step ST66. If a remaining vehicle is absent (step ST66: N), the server CPU 54 may end this control.

In remotely controlling the traveling of the multiple vehicles in this manner, for example, when generating the traveling control value for each vehicle in step ST64 described above, the server CPU 54 may execute the merging traveling control according to any of the foregoing example embodiments.

In this case, on the basis of the mapping result for each lane of the road regarding the vehicle 1 for which a traveling control value is to be generated, the server CPU 54 may determine that each vehicle is traveling on the merging origin lane L2 of the merging section, or that each vehicle is traveling on the merging destination lane L1.

The server CPU 54 may compare the respective front-rear positions of the front end of the vehicle 1 on the merging destination lane L1 and the front end of the vehicle on the merging origin lane L2, and select, out of the one or more vehicles traveling on the merging origin lane L2 of the merging section, the control target vehicle for the vehicle 1 traveling on the merging destination lane L1 of the merging section.

The server CPU 54 may select the control target vehicle, on the basis of the mapping result for each lane regarding the other vehicle 2 traveling on the lane running in parallel.

The server CPU 54 may identify a section in which the vehicle 1 is not continuously mapped as a merging point where a lane change is to be made.

The server CPU 54 may determine that the merging section is congested, on the basis of the number or traveling speed of the vehicles in the merging section.

By using results of these determinations, the server CPU 54 may execute the merging traveling control in FIG. 7, the merging traveling control in FIG. 10, the control target vehicle selection control in FIG. 12, the merging section traveling determination control in FIG. 13, and the control target vehicle selection control in FIG. 16 described above.

For example, in a case where the server CPU 54 has selected a control target vehicle for the vehicle 1 traveling on the merging destination lane L1 of the merging section, the server CPU 54 may generate and transmit a traveling control value involving deceleration to allow the control target vehicle to merge in front of the own vehicle. In contrast, in a case where the server CPU 54 has not selected a control target vehicle for the vehicle 1 traveling on the merging destination lane L1, the server CPU 54 may generate and transmit a traveling control value that allows the vehicle on the merging origin lane L2 to merge behind the own vehicle. In this case, the vehicle 1 on the merging destination lane L1 may refrain from executing control of allowing the vehicle on the merging origin lane L2 to merge immediately in front of the own vehicle on the merging destination lane L1.

In a case where the server CPU 54 has selected a control target vehicle for the vehicle 1 traveling on the merging origin lane L2 of the merging section, the server CPU 54 may generate and transmit a traveling control value that causes the vehicle 1 to merge behind the control target vehicle. In contrast, in a case where the server CPU 54 has not selected a control target vehicle for the vehicle 1 traveling on the merging origin lane L2 of the merging section, the server CPU 54 may generate and transmit a traveling control value that causes the vehicle 1 to move as it is and merge from the merging origin lane L2 to the merging destination lane L1.

Note that, in the example embodiment, the server CPU 54 of the server 31 may generate the traveling control value usable for the traveling control in the vehicle 1 on the basis of the traveling information on the vehicle 1, and transmit the traveling control value to the vehicle 1.

In another example, the server CPU 54 of the server 31 and the ECU 44 of the vehicle 1 may cooperatively perform, in a distributed manner, the processes from the collection of the traveling information on the vehicle 1 to the generation of the traveling control value usable for the traveling control.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

Each of the ECU 44 illustrated in FIG. 5 and the server CPU 54 illustrated in FIG. 17 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the ECU 44 and the server CPU 54. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the ECU 44 illustrated in FIG. 5 and the server CPU 54 illustrated in FIG. 17.

The invention claimed is:

1. A vehicle traveling control apparatus configured to be used to control traveling of a first vehicle traveling in a merging section, the vehicle traveling control apparatus comprising:
a selection unit configured to select a control target vehicle for the first vehicle traveling on a merging destination lane of the merging section, out of one or more second vehicles traveling on a merging origin lane of the merging section; and
a traveling control unit configured to control the traveling of the first vehicle traveling on the merging destination lane, to allow the selected control target vehicle to merge immediately in front of the first vehicle on the merging destination lane, wherein
the selection unit is configured to compare respective front-rear positions of a front end of the first vehicle and a front end of each of the one or more second vehicles, and select, as the control target vehicle for the first vehicle, a second vehicle from the one or more second vehicles, the second vehicle being located forward of the first vehicle, and
the traveling control unit is configured to,
when the control target vehicle is selected from the one or more second vehicles, execute, regarding the traveling of the first vehicle, control of allowing the control target vehicle on the merging origin lane to merge immediately in front of the first vehicle on the merging destination lane, and, when the control target vehicle is not selected from the one or more second vehicles, refrain from executing, regarding the traveling of the first vehicle, control of allowing any of the one or more second vehicles on the merging origin lane to merge immediately in front of the first vehicle on the merging destination lane.

2. The vehicle traveling control apparatus according to claim 1, wherein the selection unit is configured to compare the respective front-rear positions of the front end of the first vehicle and the front end of each of the one or more second vehicles, and provisionally select, as the control target vehicle, the second vehicle located forward of the first vehicle, determine whether the first vehicle is able to decelerate, at an earlier point before an ending point of the merging section, to let in the provisionally selected second vehicle in front of the first vehicle, finally select the provisionally selected second vehicle as the control target vehicle, when the first vehicle is able to decelerate, and refrain from finally selecting the provisionally selected second vehicle as the control target vehicle, when the first vehicle is unable to decelerate.

3. The vehicle traveling control apparatus according to claim 2, wherein the selection unit is configured to select the control target vehicle, from the one or more second vehicles comprising a second vehicle traveling before a point where the merging section starts on a road.

4. The vehicle traveling control apparatus according to claim 3, wherein the selection unit is configured to select the control target vehicle regarding at least a point where merging occurs, as well as a merging section set on a road, the point where merging occurs comprising an intersection without a traffic light, an entrance of a tollgate, or an entrance of a parking lot.

5. The vehicle traveling control apparatus according to claim 3, wherein the selection unit is configured to, when multiple second vehicles selectable from the one or more second vehicles as the control target vehicle are present on the merging origin lane in a state in which a speed of the first vehicle is lower than a threshold, select, as the control target vehicle, one of the multiple second vehicles that is in a same order as the first vehicle from an ending point of the merging section.

6. The vehicle traveling control apparatus according to claim 2, wherein the selection unit is configured to select the control target vehicle regarding at least a point where merging occurs, as well as a merging section set on a road, the point where merging occurs comprising an intersection without a traffic light, an entrance of a tollgate, or an entrance of a parking lot.

7. The vehicle traveling control apparatus according to claim 2, wherein the selection unit is configured to, when multiple second vehicles selectable from the one or more second vehicles as the control target vehicle are present on the merging origin lane in a state in which a speed of the first vehicle is lower than a threshold, select, as the control target vehicle, one of the multiple second vehicles that is in a same order as the first vehicle from an ending point of the merging section.

8. The vehicle traveling control apparatus according to claim 1, wherein the selection unit is configured to select the control target vehicle, from the one or more second vehicles comprising a second vehicle traveling before a point where the merging section starts on a road.

9. The vehicle traveling control apparatus according to claim 8, wherein the selection unit is configured to select the control target vehicle regarding at least a point where merging occurs, as well as a merging section set on a road, the point where merging occurs comprising an intersection without a traffic light, an entrance of a tollgate, or an entrance of a parking lot.

10. The vehicle traveling control apparatus according to claim 8, wherein the selection unit is configured to, when multiple second vehicles selectable from the one or more second vehicles as the control target vehicle are present on the merging origin lane in a state in which a speed of the first vehicle is lower than a threshold, select, as the control target vehicle, one of the multiple second vehicles that is in a same order as the first vehicle from an ending point of the merging section.

11. The vehicle traveling control apparatus according to claim 1, wherein the selection unit is configured to select the control target vehicle regarding at least a point where merging occurs, as well as a merging section set on a road, the point where merging occurs comprising an intersection without a traffic light, an entrance of a tollgate, or an entrance of a parking lot.

12. The vehicle traveling control apparatus according to claim 1, wherein the selection unit is configured to, when multiple second vehicles selectable from the one or more second vehicles as the control target vehicle are present on the merging origin lane in a state in which a speed of the first vehicle is lower than a threshold, select, as the control target vehicle, one of the multiple second vehicles that is in a same order as the first vehicle from an ending point of the merging section.

13. A vehicle comprising:

a sensor configured to perform detection of one or more second vehicles located around a first vehicle serving as the vehicle; and a traveling control processor configured to control traveling of the first vehicle by using at least a result of the detection performed by the sensor, wherein, when the first vehicle travels on a merging destination lane of a merging section, the traveling control processor is configured to, when a control target vehicle is selected from the one or more second vehicles traveling on a merging origin lane of the merging section, based on comparison between respective front-rear positions of a front end of the first vehicle and a front end of each of the one or more second vehicles, execute control of allowing the control target vehicle on the merging origin lane to merge immediately in front of the first vehicle on the merging destination lane, and, when the control target vehicle is not selected from the one or more second vehicles, refrain from executing control of allowing any of the one or more second vehicles on the merging origin lane to merge immediately in front of the first vehicle on the merging destination lane.

14. A server comprising:

a communicator configured to communicate with a first vehicle and one or more second vehicles to control or assist traveling of the first vehicle; and a processor configured to generate traveling control information for the first vehicle based at least information acquired by the communicator, wherein the processor comprises an acquisition unit configured to acquire information regarding traveling of the first vehicle and the one or more second vehicles, from the first vehicle and the one or more second vehicles traveling in a merging section, a selection unit configured to select a control target vehicle for the first vehicle traveling on a merging destination lane of the merging section, out of the one or more second vehicles traveling on a merging origin lane of the merging section, by comparing, based on the acquired information, respective front-rear positions of a front end of the first vehicle and a front end of each of the one or more second vehicles, and a traveling control unit configured to control the traveling of the first vehicle traveling on the merging destination lane, to allow the control target vehicle to merge immediately in front of the first vehicle on the merging destination lane, the selection unit is configured to compare the respective front-rear positions of the front end of the first vehicle and the front end of each of the one or more second vehicles, and select, as the control target vehicle, a second vehicle from the one or more second vehicles, the second vehicle being located forward of the first vehicle, and the traveling control unit is configured to, when the control target vehicle is selected from the one or more second vehicles, execute, regarding the traveling of the first vehicle, control of allowing the control target vehicle on the merging origin lane to merge immediately in front of the first vehicle on the merging destination lane, and, when the control target vehicle is not selected from the one or more second vehicles, refrain from executing, regarding the traveling of the first vehicle, control of allowing any of the one or more second vehicles on the merging origin lane to merge immediately in front of the first vehicle on the merging destination lane.

15. A vehicle traveling control apparatus configured to be used to control traveling of a first vehicle traveling in a merging section, the vehicle traveling control apparatus comprising circuitry configured to select a control target vehicle for the first vehicle traveling on a merging destination lane of the merging section, out of one or more second vehicles traveling on a merging origin lane of the merging section, and control the traveling of the first vehicle traveling on the merging destination lane, to allow the selected control target vehicle to merge immediately in front of the first vehicle on the merging destination lane, wherein, the circuitry is configured to, when selecting the control target vehicle, compare respective front-rear positions of a front end of the first vehicle and a front end of each of the one or more second vehicles, and select, as the control target vehicle for the first vehicle, a second vehicle from the one or more second vehicles, the second vehicle being located forward of the first vehicle, and, when controlling the traveling of the first vehicle, the circuitry is configured to, when where the control target vehicle is selected from the one or more second vehicles, execute, regarding the traveling of the first vehicle, control of allowing the control target vehicle on the merging origin lane to merge immediately in front of the first vehicle on the merging destination lane, and, when where the control target vehicle is not selected from the one or more second vehicles, refrain from executing, regarding the traveling of the first vehicle, control of allowing any of the one or more second vehicles on the merging origin lane to merge immediately in front of the first vehicle on the merging destination lane.

16. A server comprising:

a communicator configured to communicate with a first vehicle and one or more second vehicles to control or assist traveling of the first vehicle; and circuitry configured to generate traveling control information for the first vehicle based on at least information acquired by the communicator, wherein the circuitry is configured to acquire information regarding traveling of the first vehicle and the one or more second vehicles, from the first vehicle and the one or more second vehicles traveling in a merging section, select a control target vehicle for the first vehicle traveling on a merging destination lane of the merging section, out of the one or more second vehicles traveling on a merging origin lane of the merging section, by comparing, based on the acquired information, respective front-rear positions of a front end of the first vehicle and a front end of each of the one or more second vehicles, and control the traveling of the first vehicle traveling on the merging destination lane, to allow the control target vehicle to merge immediately in front of the first vehicle on the merging destination lane, the circuitry is configured to, when selecting the control target vehicle, compare the respective front-rear positions of the front end of the first vehicle and the front end of each of the one or more second vehicles, and select, as the control target vehicle, a second vehicle from the one or more second vehicles, the second vehicle being located forward of the first vehicle, and, when controlling the traveling of the first vehicle, the circuitry is configured to, when the control target vehicle is selected from the one or more second vehicles, execute, regarding the traveling of the first vehicle, control of allowing the control target vehicle on the merging origin lane to merge immediately in front of the first vehicle on the merging destination lane, and, when the control target vehicle is not selected from the one or more second vehicles, refrain from executing, regarding the traveling of the first vehicle, control of allowing any of the one or more second vehicles on the merging origin lane to merge immediately in front of the first vehicle on the merging destination lane.

* * * * *